United States Patent
Seko et al.

(10) Patent No.: US 10,893,236 B2
(45) Date of Patent: Jan. 12, 2021

(54) SYSTEM AND METHOD FOR PROVIDING VIRTUAL INTERPERSONAL COMMUNICATION

(71) Applicant: Honda Motor Co., Ltd., Tokyo (JP)

(72) Inventors: Shigeyuki Seko, Campbell, CA (US); Shinichi Akama, Cupertino, CA (US)

(73) Assignee: Honda Motor Co., Ltd., Tokyo (JP)

( * ) Notice: Subject to any disclaimer, the term of this patent is extended or adjusted under 35 U.S.C. 154(b) by 0 days.

(21) Appl. No.: 16/178,038

(22) Filed: Nov. 1, 2018

(65) Prior Publication Data

US 2020/0145615 A1    May 7, 2020

(51) Int. Cl.
| | |
|---|---|
| *H04N 7/15* | (2006.01) |
| *G06K 9/00* | (2006.01) |
| *G10L 17/26* | (2013.01) |
| *G06N 20/00* | (2019.01) |

(52) U.S. Cl.
CPC ......... *H04N 7/157* (2013.01); *G06K 9/00302* (2013.01); *G06N 20/00* (2019.01); *G10L 17/26* (2013.01)

(58) Field of Classification Search
USPC ...................................................... 348/14.07
See application file for complete search history.

(56) References Cited

U.S. PATENT DOCUMENTS

| | | | |
|---|---|---|---|
| 2007/0260984 A1* | 11/2007 | Marks | A63F 13/79 715/706 |
| 2009/0177976 A1* | 7/2009 | Bokor | G06F 3/0481 715/753 |
| 2010/0211397 A1* | 8/2010 | Park | G06K 9/00268 704/276 |
| 2013/0258040 A1* | 10/2013 | Kaytaz | H04L 67/38 348/14.07 |
| 2014/0267544 A1* | 9/2014 | Li | H04N 7/157 348/14.02 |
| 2017/0206795 A1* | 7/2017 | Kaleal | A61B 5/11 |

FOREIGN PATENT DOCUMENTS

| | | |
|---|---|---|
| WO | 2000/031711 | 6/2000 |
| WO | 2015/114824 | 8/2015 |

* cited by examiner

*Primary Examiner* — Amal S Zenati
(74) *Attorney, Agent, or Firm* — Rankin, Hill & Clark LLP

(57) ABSTRACT

A system and method for providing virtual interpersonal communication that include receiving data associated with one-to-one interpersonal communication between a user and a target individual. The system and method also include determining at least one contextual data point and at least one associated behavioral attribute of the user and the target individual during the one-to-one interpersonal communication. The system and method additionally include analyzing at least one statement spoken by the user to a virtual representation of the target individual and presenting a virtual avatar of the target individual in a manner that replicates the personality of the target individual and communicates with the user based on the at least one contextual data point and the at least one associated behavioral attribute.

20 Claims, 6 Drawing Sheets

SYSTEM AND METHOD FOR PROVIDING VIRTUAL INTERPERSONAL COMMUNICATION

BACKGROUND

In many instances, during the course of travel a driver may wish to communicate with a specific individual (e.g., another passenger seated within a vehicle) regarding an event, a point of interest, and/or or to ask questions on various subjects. In some circumstances, the individual may not be physically located within the vehicle which may preclude one-to-one interpersonal communications between the driver and the individual. In other circumstances, the individual may not be available for remote interpersonal communications such as a phone call. In such circumstances, the driver may need to find another individual to communicate with regarding an event, a point of interest, and/to ask questions on various subjects.

This exercise may require the driver to spend a large amount of time contacting various individuals to determine if they are available when other passengers are not seated within the vehicle. Even in cases where other individuals are available, those individuals may not provide a similar point of view, knowledgebase, or capability regarding an event, a point of interest, and/or to answer questions on various subjects as the specific individual that the driver may wish to communicate with.

BRIEF DESCRIPTION

According to one aspect, a computer-implemented method for providing virtual interpersonal communication that includes receiving data associated with one-to-one interpersonal communication between a user and a target individual. The computer-implemented method also includes determining at least one contextual data point and at least one associated behavioral attribute of the user and the target individual during the one-to-one interpersonal communication. The computer-implemented method additionally includes analyzing at least one statement spoken by the user to a virtual representation of the target individual. The virtual representation of the target individual is presented as a virtual avatar of the target individual. The computer-implemented method further includes presenting the virtual avatar of the target individual in a manner that replicates the personality of the target individual and communicates with the user based on the at least one contextual data point and the at least one associated behavioral attribute.

According to another aspect, a system for providing virtual interpersonal communication that includes a memory storing instructions when executed by a processor that cause the processor to receive data associated with one-to-one interpersonal communication between a user and a target individual. The instructions also cause the processor to determine at least one contextual data point and at least one associated behavioral attribute of the user and the target individual during the one-to-one interpersonal communication. The instructions additionally cause the processor to analyze at least one statement spoken by the user to a virtual representation of the target individual. The virtual representation of the target individual is presented as a virtual avatar of the target individual. The instructions further cause the processor to present the virtual avatar of the target individual in a manner that replicates the personality of the target individual and communicates with the user based on the at least one contextual data point and the at least one associated behavioral attribute.

According to a further aspect, non-transitory computer readable storage medium storing instructions that when executed by a computer, which includes a processor perform a method. The method includes receiving data associated with one-to-one interpersonal communication between a user and a target individual. The method also includes determining at least one contextual data point and at least one associated behavioral attribute of the user and the target individual during the one-to-one interpersonal communication. The method additionally includes analyzing at least one statement spoken by the user to a virtual representation of the target individual. The virtual representation of the target individual is presented as a virtual avatar of the target individual. The method further includes presenting the virtual avatar of the target individual in a manner that replicates the personality of the target individual and communicates with the user based on the at least one contextual data point and the at least one associated behavioral attribute.

DETAILED DESCRIPTION

Figure 1:
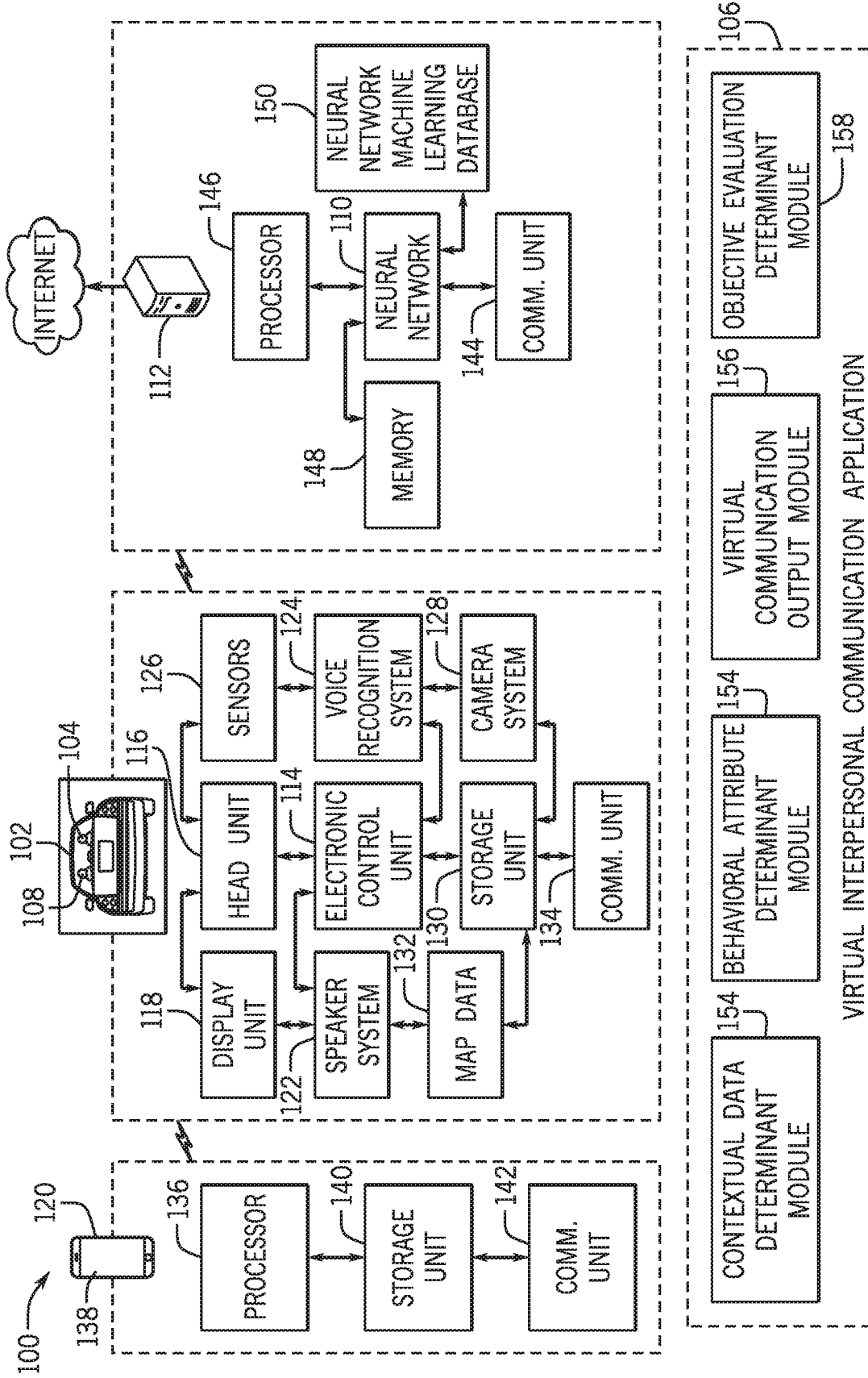
FIG. 1 is a schematic view of an exemplary operating environment of a virtual interpersonal communication system according to an exemplary operating embodiment of the present disclosure.

The following includes definitions of selected terms employed herein. The definitions include various examples and/or forms of components that fall within the scope of a term and that can be used for implementation. The examples are not intended to be limiting.

A "processor," as used herein, processes signals and performs general computing and arithmetic functions. Signals processed by the processor can include digital signals, data signals, computer instructions, processor instructions, messages, a bit, a bit stream, or other computing that can be received, transmitted and/or detected.

A "bus", as used herein, refers to an interconnected architecture that is operably connected to other computer components inside a computer or between computers. The bus can transfer data between the computer components. The bus can be a memory bus, a memory controller, a peripheral bus, an external bus, a crossbar switch, and/or a local bus, among others. The bus can also be a vehicle bus that interconnects components inside a vehicle using protocols such as Media Oriented Systems Transport (MOST), Controller Area network (CAN), Local Interconnect Network (LIN), among others.

"Computer communication", as used herein, refers to a communication between two or more computing devices (e.g., computer, personal digital assistant, cellular telephone, network device) and can be, for example, a network transfer, a file transfer, an applet transfer, an email, a hypertext transfer protocol (HTTP) transfer, and so on. A computer communication can occur across, for example, a wireless system (e.g., IEEE 802.11), an Ethernet system (e.g., IEEE 802.3), a token ring system (e.g., IEEE 802.5), a local area network (LAN), a wide area network (WAN), a point-to-point system, a circuit switching system, a packet switching system, among others.

A "disk", as used herein can be, for example, a magnetic disk drive, a solid state disk drive, a floppy disk drive, a tape drive, a Zip drive, a flash memory card, and/or a memory stick. Furthermore, the disk can be a CD-ROM (compact disk ROM), a CD recordable drive (CD-R drive), a CD rewritable drive (CD-RW drive), and/or a digital video ROM drive (DVD ROM). The disk can store an operating system that controls or allocates resources of a computing device.

A "database", as used herein can refer to table, a set of tables, a set of data stores and/or methods for accessing and/or manipulating those data stores. Some databases can be incorporated with a disk as defined above.

A "memory", as used herein can include volatile memory and/or non-volatile memory. Non-volatile memory can include, for example, ROM (read only memory), PROM (programmable read only memory), EPROM (erasable PROM), and EEPROM (electrically erasable PROM). Volatile memory can include, for example, RAM (random access memory), synchronous RAM (SRAM), dynamic RAM (DRAM), synchronous DRAM (SDRAM), double data rate SDRAM (DDR SDRAM), and direct RAM bus RAM (DRRAM). The memory can store an operating system that controls or allocates resources of a computing device.

A "module", as used herein, includes, but is not limited to, non-transitory computer readable medium that stores instructions, instructions in execution on a machine, hardware, firmware, software in execution on a machine, and/or combinations of each to perform a function(s) or an action(s), and/or to cause a function or action from another module, method, and/or system. A module may also include logic, a software controlled microprocessor, a discrete logic circuit, an analog circuit, a digital circuit, a programmed logic device, a memory device containing executing instructions, logic gates, a combination of gates, and/or other circuit components. Multiple modules may be combined into one module and single modules may be distributed among multiple modules.

An "operable connection", or a connection by which entities are "operably connected", is one in which signals, physical communications, and/or logical communications can be sent and/or received. An operable connection can include a wireless interface, a physical interface, a data interface and/or an electrical interface.

A "processor", as used herein, processes signals and performs general computing and arithmetic functions. Signals processed by the processor can include digital signals, data signals, computer instructions, processor instructions, messages, a bit, a bit stream, or other means that can be received, transmitted and/or detected. Generally, the processor can be a variety of various processors including multiple single and multicore processors and co-processors and other multiple single and multicore processor and co-processor architectures. The processor can include various modules to execute various functions.

A "vehicle", as used herein, refers to any moving vehicle that is capable of carrying one or more human occupants and is powered by any form of energy. The term "vehicle" includes, but is not limited to: cars, trucks, vans, minivans, SUVs, motorcycles, scooters, boats, go-karts, amusement ride cars, rail transport, personal watercraft, and aircraft. In some cases, a motor vehicle includes one or more engines. Further, the term "vehicle" can refer to an electric vehicle (EV) that is capable of carrying one or more human occupants and is powered entirely or partially by one or more electric motors powered by an electric battery. The EV can include battery electric vehicles (EV) and plug-in hybrid electric vehicles (PHEV). The term "vehicle" can also refer to an autonomous vehicle and/or self-driving vehicle powered by any form of energy. The autonomous vehicle may or may not carry one or more human occupants. Further, the term "vehicle" can include vehicles that are automated or non-automated with pre-determined paths or free-moving vehicles.

A "rating" as used herein can include, but is not limited to, a numerical or other kind of value or level such as a percentage, a non-numerical value, a discrete state, a discrete value, a continuous value, among others. The term "rating" as used throughout this detailed description and in the claims refers to any numerical or other kind of value for distinguishing between two or more states of X. For example, in some cases, the rating may be given as a percentage between 0% and 100%. In other cases, the rating could be a value in the range between 1 and 10. In still other cases, the rating may not be a numerical value, but could be associated with a given discrete state, such as "not X", "slightly x", "x", "very x" and "extremely x".

I. System Overview

Referring now to the drawings, wherein the showings are for purposes of illustrating one or more exemplary embodiments and not for purposes of limiting the same, FIG. 1 is a schematic view of an exemplary operating environment of a virtual interpersonal communication system (virtual communication system) 100 according to an exemplary operating embodiment of the present disclosure. The components of the virtual communication system 100, as well as components of other systems, hardware architectures and software architectures discussed herein, may be combined, omitted or organized into different architecture for various embodiments. However, the exemplary embodiments discussed herein focus on the system 100 as illustrated in FIG. 1, with corresponding system components, and related methods.

As shown in the illustrated embodiment of FIG. 1, the system 100 may include a vehicle 102 that may include one or more occupants. The one or more occupants may include a user 104 (e.g., driver) that may utilize a virtual interpersonal communication application (virtual communication application) 106. In one embodiment, the virtual communication application 106 may be utilized by the user 104 to assign an additional occupant (e.g., non-driving passenger) seated within the vehicle 102 as a target individual 106. The target individual 106 may be accordingly assigned as an individual with which the user 104 conducts one-to-one (in-person) interpersonal communications with.

The target individual 106 may also be accordingly assigned by the user 104 based on an intention to conduct virtual interpersonal communications with through a virtual representation of the target individual 108 that is presented by the virtual communication application 106 in a manner that replicates the personality of the target individual 108. As discussed below, the application 106 may present the virtual representation of the target individual 108 as a virtual avatar 108a (shown in FIG. 2) that includes the replicated personality of the target individual 106 when the target individual 106 is determined not to be seated within the vehicle 102 (and may not be available for remote communication such as a phone call).

As discussed in more detail below, during a training mode of the virtual communication application 106, the application 106 may evaluate conversations between the user 104 and the target individual 106 to determine contextual data points of each conversation that are respectively associated to the statements spoken by the user 104 and the target individual 108. In particular, the contextual data points may pertain (e.g., include data that pertains) to a content (e.g., a subject matter of the statement), one or more categories of context, one or more subcategories of context (e.g., questions, follow-up questions, opinions), sub-topics (e.g., follow-up statements on related topics), event references (e.g., statements/questions referring to daily events, particular events, social events, on-going activities), point of interest references (e.g., statements/questions referring to particular points of interests that may be located within a proximity of the vehicle 102), and the like that the user 104 may engage in during the one-to-one interpersonal communications and/or virtual interpersonal communications.

The contextual data points may include data that pertains to response patterns provided by the target individual 108 that may pertain to a content, one or more categories of context, one or more subcategories of context, one or more sub-topics, one or more event references, and/or one or more point of interest references (and the like) that the user 104 and target individual 108 may engage in during the one-to-one interpersonal communications. As discussed below, the application 106 may additionally evaluate data provided by various sources to capture and determine one or more behavioral attributes that are associated to behaviors (e.g., body language, physiological characteristics, voice inflection, and emotions in the form of happy, angry, and sad emotions expressions/reactions) exhibited by the user 104 and/or the target individual 106 during the course of the one-to-one interpersonal communication.

The virtual communication application 106 may analyze the one or more behavioral attributes with respect to the contextual data points and may associate the one or more behavioral attributes to one or more respective contextual data points based on the one or more behavioral responses exhibited by the target individual 108 and/or the user 104 while providing statements associated with one or more contextual data points. Stated differently, the association of the one or more behavioral attributes to the one or more contextual data points may thereby link physiological reactions and emotional reactions exhibited by user 104 and the target individual 108 to statements/responses pertaining to a particular content, one or more particular categories and subcategories of context, particular sub-topics, particular event references, particular point of interest references, and the like that are communicated between the user 104 and the target individual 108.

As discussed in more detail, the application 106 may utilize machine learning executed through a neural network 110 stored on an externally hosted computing infrastructure (external server) 112 to be trained regarding the contextual data points associated with each instance of one-to-one communication (e.g., with each conversation). Additionally, the application 106 may utilize the machine learning to associate the behavioral attribute(s) to each of the contextual data points to be trained regarding the associated behavioral attributes.

The training of the neural network 110 may be utilized to replicate the personality of the target individual 108 as virtual interpersonal communication is provided during an execution mode of the virtual communication application 106. More specifically, a database of contextual data points and associated behavioral attributes may be stored and continually built to train the neural network 110 (each time the user 104 engages in one-to-one interpersonal communication with the target individual 108) to be utilized to provide virtual interpersonal communication between the user 104 and the virtual avatar 108a of the target individual during the execution mode of the application 106.

During the execution mode of the virtual communication application 106, the application 106 may be configured to allow the user 104 to virtually (e.g., electronically) communicate with the virtual avatar 108a of the individual 108. As discussed below, the virtual avatar 108a is presented to have a similar personality to the target individual 108. The application 106 may facilitate virtual interpersonal communication between the virtual avatar 108a of the target individual 108 and the user 104 to allow the virtual avatar 108a to receive verbal and/or non-verbal communications from the user 104 (e.g., spoken statements, commands, and/or questions associated with hand gestures, facial expressions, and associated body language) and to respond to the user 104 using a virtual personality that replicates the personality (and persona) of the target individual 108.

The application 106 thereby allows the virtual avatar 108a to communicate vocal responses (audibly provided to the user 104 within the vehicle 102 based on the stored contextual data points) and behavioral responses (visually presented to the user 104 within the vehicle 102 based on the associated behavioral attributes) according to determined contextual data points of the virtual interpersonal communication. The contextual data points determined during the virtual interpersonal communication may pertain (e.g., include data that pertains) to a content, one or more categories of context, one or more subcategories of context, one or more sub-topics, one or more event references, and/or one or more point of interest references based on commands/questions/statements provided by the user 104 and responded to by the virtual avatar 108a.

The application 106 thereby allows the virtual avatar 108a to communicate with the user 104 in a manner that matches the personality of the target individual 108 based on computer analysis of determined contextual data points and associated behavioral attributes determined during the execution mode (during a real-time instance of virtual interpersonal communication) of the application 106 with respect to stored contextual attributes and associated behavioral attributes determined and stored during the training mode of the application 106 (during past one-to-one interpersonal communications).

The determined contextual data points may be dynamic and based on a flow of one-to-one interpersonal communication (e.g., conversation and associated body language) between the user 104 and the target individual 108 (as determined during the training mode of the application 106) and/or the user 104 and the virtual avatar 108a (as determined during the execution mode of the application 106). Additionally, as discussed in more detail, the application 106 may include an evaluation mode that facilitates one or more third-party evaluators (not shown) to view one or more sessions (e.g., a predetermined period of time) of one or more instances of virtual interpersonal communications between the user 104 and the virtual avatar 108*a*. During the evaluation mode, the application 106 may also allow the third party evaluator(s) to provide feedback regarding the quality of the virtual interpersonal communication (that may be provided in comparison to one or more sessions of the one-to-one interpersonal communication between the user 104 and the target individual 108).

The feedback may include ratings that may apply to a quality of the replicated personality of the virtual avatar 108*a* of the target individual 108 with respect to the real personality of the target individual 108. In other words, the ratings may apply to a quality of virtual response patterns spoken by the virtual avatar 108*a* and behavioral responses exhibited by the virtual avatar 108*a* of the target individual 108 during virtual interpersonal communications with the user 104 with respect to an objective analysis of response patterns and behavioral responses exhibited by the target individual 108 during similar one-to-one interpersonal communication (e.g., regarding similar contextual topics) with the user 104.

In one embodiment, the feedback may be used by the application 106 to update the data set stored during the training mode to further train the neural network 110 on the personality of the target individual 108 to thereby improve the quality of virtual interpersonal communication between the user 104 and the virtual avatar 108*a* of the individual 108. Stated differently, the feedback may be utilized by the application 106 to improve the replicated personality of the virtual avatar 108*a* to thereby provide a higher level of matching to the personality of the target individual 108 based on the updating of contextual data points and associated behavioral attributes that are associated with one or more conversations (e.g., contextual topics).

This disclosure discusses the components of the system 100 and the virtual communication application 106 being executed in relation to a vehicle 102. However, it is to be appreciated that one or more components of the system 100, additional components of the system 100 (in addition to the components shown in FIG. 1) (not shown), and/or the virtual communication application 106 may be utilized and/or executed outside of a vehicular environment. Additionally, the system 100, one or more components of the system 100, additional components of the system 100, and the application 106 may be utilized and executed to capture interpersonal communication between the user 104, the individual 108, and/or virtual interpersonal communication between the user 104 and the virtual avatar 108*a* of the target individual 108*a* outside of the vehicular environment.

For example, the system 100, one or more components of the system 100, one or more additional components of the system 100, and the virtual communication application 106 may be utilized and executed to capture interpersonal communication between the user 104 and the target individual 108 within a home environment through a television/monitor (not shown), portable devices (not shown) and/or speakers (e.g., smart speakers) (not shown). However, for purposes of simplicity the components of the system 100 and the virtual communication application 106 will be discussed in relation to the vehicle 102 and the vehicular environment.

With continued reference to FIG. 1, the vehicle 102 may generally include an electronic control unit (ECU) 114 that operably controls a plurality of components of the vehicle 102. In an exemplary embodiment, the ECU 114 of the vehicle 102 may include a processor (not shown), a memory (not shown), a disk (not shown), and an input/output (I/O) interface (not shown), which are each operably connected for computer communication via a bus (not shown). The I/O interface provides software and hardware to facilitate data input and output between the components of the ECU 114 and other components, networks, and data sources, of the system 100. In one embodiment, the ECU 114 may execute one or more operating systems, applications, and/or interfaces that are associated with the vehicle 102.

In one or more configurations, the ECU 114 may be in communication with a head unit 116. The head unit 116 may include internal processing memory, an interface circuit, and bus lines (components of the head unit not shown) for transferring data, sending commands, and communicating with the components of the vehicle 102. In one or more embodiments, the ECU 114 and/or the head unit 116 may execute one or more operating systems, applications, and/or interfaces that are associated to the vehicle 102 through a display unit 118 of the head unit 116.

In particular, the display unit 118 may be disposed within a center stack area (not shown) of the vehicle 102 and may be utilized to display one or more application human machine interfaces (application HMI) to provide the user 104 with various types of information and/or to receive one or more inputs from the user 104. The display unit 118 may be capable of receiving inputs from the user 104 directly or through an associated keyboard/touchpad (not shown). In one embodiment, the application HMIs may pertain to one or more application interfaces, including one or more user interfaces associated with the virtual communication application 106. As discussed below, the one or more user interfaces associated with the virtual communication application 106 may be presented through the display unit 118 (and/or a mobile device (not shown) used by the user 104).

As discussed in more detail below, the application 106 may present a setup interface to allow the user 104 to add an additional individual (e.g., additional occupant of the vehicle 102) as the target individual 108. As discussed, the addition of the target individual 108 may be utilized by the application 106 to capture and determine the contextual data points and associated behavioral attributes associated with the target individual 108 to create the virtual avatar 108*a* of the target individual 108 and its associated personality that is configured to replicate and match the personality of the target individual 108. The user 104 may provide inputs via the setup interface to allow the application 106 to setup a profile associated with the user 104 and the target individual 108.

Figure 2:
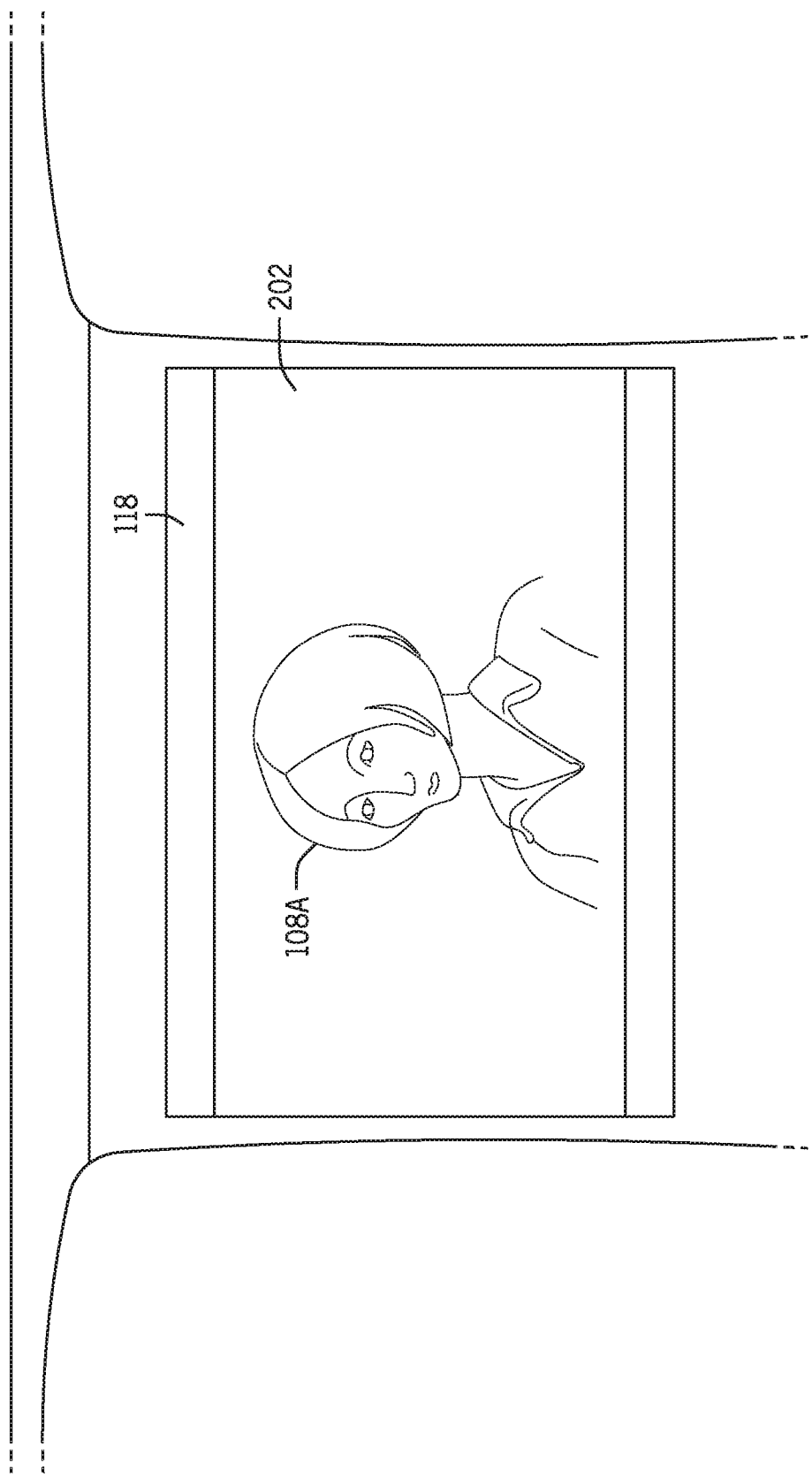
FIG. 2 is an illustrative example of the virtual communication interface presenting a virtual avatar of a target individual presented through a display unit of a vehicle according to an exemplary embodiment.

FIG. 2 includes an illustrative example of the virtual communication interface presenting the virtual avatar 108*a* of the target individual 108 presented through the display unit 118 of the vehicle 102 according to an exemplary embodiment. In one configuration, the application 106 may also be configured to present a virtual communication interface 202 via the display unit 118. As shown in the illustrative example of FIG. 2, the virtual communication application 106 may present the virtual representation of the target individual 108 through a physical portrayal of the virtual avatar 108*a* of the target individual 108.

The physical portrayal of the virtual avatar 108*a* may be presented as a graphical moving image/video of the target individual 108 that may be presented to the user 104 as the virtual interpersonal communication is being conducted between the user 104 and the virtual avatar 108*a* during the execution mode of the application 106. In other words, the physical portrayal of the virtual avatar 108*a* may be presented to facilitate virtual interpersonal communication between the user 104 and the virtual avatar 108a of the target individual 108 (during the execution mode of the application 106).

Referring again to FIG. 1, the head unit 116 may be operably connected to a speaker system 122 of the vehicle 102. The speaker system 122 may include one or more speakers (not shown) (e.g., various speaker configurations) that may be disposed at one or more locations within the vehicle 102. In one embodiment, the one or more speakers of the speaker system 122 may be utilized by the application 106 to synthesize the voice of the target individual 108 (captured by one or more microphones, discussed below) to allow the virtual avatar 108a to communicate (e.g., in a conversation, responses to questions, responses to statements) to the user 104 during virtual interpersonal communication between the user 104 and the virtual avatar 108a of the target individual 108. Accordingly, the ECU 114 and/or the head unit 116 may operably control the display unit 118 and the speaker system 122 to present the physical portrayal of the virtual avatar 108a through the virtual communication interface 202 in synchronization with the synthesized voice of the target individual 108.

In an exemplary embodiment, the ECU 114 and/or the head unit 116 may be operably connected to a voice recognition system 124 of the vehicle 102. The voice recognition system 124 may include one or more microphones (not shown) located within the vehicle 102 and hardware configured to receive vocal data (e.g., sensed voices within the vehicle 102) provided by the user 104 and/or the target individual 108 within the vehicle 102. In some configurations, the voice recognition system 124 may communicate with an associated voice recognition system (not shown) of the portable device 120 used by each third party evaluator to receive vocal feedback spoken by the third party evaluator, received via one or more microphones (not shown) of the portable device 120. For purposes of simplicity, the voice recognition system 124 of the vehicle 102 will be discussed in more detail within this disclosure. However, it is to be appreciated that the disclosure with respect to the functionality of the voice recognition system 124 may also apply to the associated voice recognition system of the portable device 120.

In one or more configurations, the voice recognition system 124 may be enabled to analyze voices in the form of vocal data that is sensed by the microphone(s). The voice recognition system 124 may be configured to locate human speech patterns upon receiving an activation signal from the application 106. In one embodiment, upon locating human speech patterns, the voice recognition system 124 may be configured to capture the voice, speech patterns, and vocal inflections of the user 104 and the target individual 108 to be stored for voice recognition to determine live interpersonal communication between the user 104 and the target individual 108.

In particular, the virtual communication application 106 may utilize the voice recognition system 124 to learn and store respective vocal data associated with the user 104 and the target individual 108 within respective voice recognition data files onto a storage unit 130 of the vehicle 102. The application 106 may be configured to link a respective voice recognition data file to the user 104 and a respective voice recognition data file to the target individual 108 to be utilized to identify the user 104 and/or the target individual 108 and to determine live interpersonal communication between the user 104 and the target individual 108.

As discussed below, during the training mode, the virtual communication application 106 may analyze real-time vocal data against the voice recognition data file(s) and may provide comparison details to the application 106 to determine if the user 104 is conducting one-to-one interpersonal communication with the target individual 108. Additionally, during the execution mode of the application 106, the virtual communication application 106 may also analyze real-time vocal data against the voice recognition data file(s) and may provide comparison details to the application 106 to determine if the user 104 is speaking/intending to communicate with the virtual avatar 108a of the target individual 108.

In one configuration, if the application 106 determines that the user 104 is partaking in the virtual interpersonal communication, the application 106 may thereby analyze the vocal data to determine contextual data points and associated behavioral attributes associated with the user's statements (e.g., speech, questions, and comments). The application 106 may thereby utilize the neural network 110 to determine a virtual response pattern to be provided by the virtual avatar 108a based on one or more stored behavioral attributes of the target individual 108 (stored during the training mode) that are associated with the contextual data points associated with the user and/or stored contextual data points associated with the target individual 108 (stored during the training mode).

The application 106 may also utilize the neural network 110 to determine one or more behavioral responses that are associated with the virtual response pattern. The one or more behavioral responses may be associated with particular contextual data points associated with the virtual response pattern of the virtual avatar 108a to thereby present the virtual avatar 108a with a virtual personality that includes statement, sentiments, behavioral responses/reactions, and emotional responses/reactions of the individual 108 when communicating with the user 104.

In one configuration, vocal data associated with the target individual 108 may be captured and utilized by the application 106 to provide speech synthesis that allows the virtual avatar 108a of the target individual 108 to speak using a synthesized voice of the target individual 108. The synthesized voice may be provided to replicate the (natural) voice of the target individual 108 such that the synthesized voice of the virtual avatar 108a sounds similar (e.g., identical) to the voice of the target individual 108 while speaking.

In an additional embodiment, the voice recognition system 124 may be configured to sense a particular trigger phrase that may be spoken by the user 104 to enable/re-enable the training mode and/or the execution mode of the application 106. Upon sensing the trigger phrase, the voice recognition system 124 may analyze the vocal data sensed by the microphone(s). For example, the target individual's name (as stored within a profile associated with the target individual 108) or a nickname assigned to the virtual avatar 108a of the target individual 108 (as stored within the profile associated with the target individual 108) may be used by the application 106 as a trigger phrase to enable/re-enable the training mode and/or the execution mode of the application 106.

The virtual communication application 106 may thereby enable the voice recognition system 124 to further analyze the vocal data sensed by the microphone(s) to determine one-to-one interpersonal communication between the user 104 and the target individual 108. In one embodiment, the application 106 may enable the voice recognition system 124 to analyze the vocal data sensed by the microphone(s) to determine that the user 104 is initiating virtual interpersonal communication with the virtual avatar 108a of the target individual 108. Upon determining that the user 104 is initiating the virtual interpersonal communication with the virtual avatar 108a, the application 106 may enable the execution mode to thereby provide virtual response patterns through the virtual avatar 108a of the target individual 108.

Upon enablement by the application 106 to analyze the vocal data, the voice recognition system 124 may thereby generate a textual or other simple representation of one or more words in the form of the voice input(s) that is provided by the voice recognition system 124 to the virtual communication application 106. In some embodiments, the voice recognition system 124 may generate multiple possible words or phrases such as when the voice recognition system 124 may not resolve the spoken word or phrase with 100% certainty. In such embodiments, the voice recognition system 124 may provide possible phrases in the form of voice inputs to the virtual communication application 106. Additionally, the voice recognition system 124 may also provide a "confidence value" within the voice inputs for each such possible phrase indicating how confident the voice recognition system 124 is that each possible phrase was the actual phrase spoken.

In one embodiment, the vehicle 102 may additionally include a plurality of sensors 126 that may be disposed in various locations of the vehicle 102 (e.g., vehicle seats, panels, wearable devices, etc.). The plurality of sensors 126 may include electric current (e.g., proximity sensors, inductive, capacitive), ultrasonic (e.g., piezoelectric, electrostatic), vibration, optical, photoelectric or oxygen sensors, among others). It is appreciated that the plurality of sensors 126 are operable to sense a measurement of data associated with the user 104 and the target individual 108.

The plurality of sensors 126 may be configured to output one or more data signals indicating one or more measurements of data as sensed by the plurality of sensors 126 to the virtual communication application 106. The application 106 may convert the data signals into other data formats in order to determine behavioral attributes that include physiological characteristics associated with the user 104 and/or the target individual 108.

In one embodiment, the physiological characteristics may include, but may not be limited to, pupil dilatation, breathing rate, blinking rate, heart rate, muscle movements, and the like. As discussed below, the behavioral attributes in the form of physiological characteristics of the target individual 108 may be associated to one or more contextual data points of the communication between the user 104 and the target individual 108 that may be utilized by the virtual communication application 106 to replicate certain physiological characteristics with respect to the virtual avatar 108a of the target individual 108.

The behavioral attributes may be utilized by the virtual communication application 106 to replicate certain physiological characteristics with respect to the virtual avatar 108a of the target individual 108. In other words, based on the one or more determined contextual data points of the communications between the user 104 and the virtual avatar 108a, the application 106 may present the virtual avatar 108a as exhibiting behavioral responses that include the similar physiological characteristics as the target individual 108 would exhibit during a one-to-one communication of the same context. For example, the application 106 may present the physical portrayal of virtual avatar 108a with a similar blinking rate, breathing rate, and pupil dilatation during the course of communication based on one or more behavioral attributes that are associated with the context of the virtual interpersonal communication that matches the context of one-to-one interpersonal communication that is associated to one or more behavioral attributes.

In one or more embodiments, the ECU 114 and/or the head unit 116 may be operably connected to a camera system 128 of the vehicle 102. The camera system 128 may be operably connected to a plurality of cameras (not shown) that may be disposed at a plurality of locations within the vehicle 102. The plurality of cameras may be configured to capture images/video of the user 104 and the target individual 108 seated within the vehicle 102. In one embodiment, the plurality of cameras of the camera system 128 may be configured to capture particular behavioral attributes in the form of emotional characteristics of the user 104 and the target individual 108 that may include, but may not be limited to, facial expressions (reactions), body movements, body language and the like, respectively associated with the user 104 and the target individual 108.

As discussed below, the behavioral attributes in the form of emotional characteristics of the user 104 and the target individual 108 may be associated to the context of the one-to-one interpersonal communication between the user 104 and the target individual 108. The emotional characteristics of the target individual 108 may be utilized by the virtual communication application 106 to replicate certain emotional characteristics with respect to the virtual avatar 108a of the target individual 108. For example, the application 106 may present the virtual avatar 108a with a similar facial expressions, body language, and body movements during the course of communication based on one or more behavioral attributes that are associated with one or more contextual data points of the virtual interpersonal communication that matches one or more contextual data points of one-to-one interpersonal communication between the user 104 and the target individual 108.

In an exemplary embodiment, the storage unit 130 of the vehicle 102 may store one or more operating systems, applications, associated operating system data, application data, vehicle system and subsystem user interface data, and the like that are executed by the ECU 114, the head unit 116, and one or more applications executed by the ECU 114 and/or the head unit 116 including the virtual communication application 106. In one embodiment, the virtual communication application 106 may store application data on the storage unit 130. The application data may be retrieved by the application 106 when evaluating data captured by the speaker system 122, the plurality of sensors 126, and the camera system 128. Additionally, one or more systems of the vehicle 102 may store data on the storage unit 130. For example, as discussed above, the voice recognition system 124 may store vocal data (files) on the storage unit 130 to be retrieved by the virtual communication application 106.

In one embodiment, the storage unit 130 may store map data 132 that may be accessed by one or more systems of the vehicle 102 including a navigation system (not shown). The map data 132 may pertain to geographical maps, satellite/aerial imagery, and point of interest information associated with one or more locations that may be located within a proximity of the vehicle 102, as determined based on GPS data provided by a navigation system (not shown). In some configurations, the virtual communication application 106 may be configured to access the storage unit 130 to evaluate the map data 132 to determine information associated with one or more points of interest. The information associated with the one or more points of interest may be utilized by the application 106 to determine the contextual data points associated with the user 104 and/or the target individual 108 and pertains to a context/content of particular interpersonal communications between the user 104 and the target individual 108 and/or a context/content of particular virtual interpersonal communications between the user 104 and the virtual avatar 108*a* of the target individual 108.

As an illustrative example, if the user 104 points out of a window (not shown) of the vehicle 102 and states to the target individual 108 "what do you think about eating lunch over there," the application 106 may utilize data provided by the camera system 128 that is associated with the location at which the user 104 is pointing at. The application 106 may also utilize data retrieved from the map data 132 associated with a point of interest that the user 104 is pointing at to determine that the user 104 is pointing at a particular restaurant.

The application 106 may thereby determine the contextual data point pertaining to 'lunch/meal at the particular restaurant' associated with the interpersonal communication regarding "lunch" and may thereby determine and evaluate the target individual's behavioral reaction (through physiological characteristics and emotional characteristics exhibited by the target individual 108) to add data pertaining to the target individual's response as a contextual data point and associated behavioral attributes (e.g., vocal inflections, facial expressions, emotions).

For instance, if the target individual's response is "I love that place" as she smiles and expresses excitement, the application 106 may be configured to add 'great response, excitement, love that place' as a contextual data point in regard to 'lunch/meal at the particular restaurant (identified by the name of restaurant). The application 106 may also add associated behavioral attributes to the neural network 110 that are associated with the contextual data points that may include data pertaining to the target individual's behavioral characteristics and emotional characteristics while providing the response.

With continued reference to FIG. 1, the vehicle 102 may additionally include a communication unit 134. The communication unit 134 may be capable of providing wired or wireless computer communications utilizing various protocols to send/receive non-transitory signals internally to the plurality of components of the vehicle 102 and/or externally to external devices such as the portable device 120 used by the third party evaluator and/or the external server 112 that hosts the neural network 110. Generally, these protocols include a wireless system (e.g., IEEE 802.11 (Wi-Fi), IEEE 802.15.1 (Bluetooth®)), a near field communication system (NFC) (e.g., ISO 13157), a local area network (LAN), and/or a point-to-point system.

With particular reference to the portable device 120 used by each third party evaluator, the portable device 120 may include a processor 136 for providing processing and computing functions. The processor 136 may be configured to control one or more components of the portable device 120. The processor 136 may also be configured to execute one or more applications including the virtual communication application 106. The processor 136 of the portable device 120 may also be configured to operably control a display screen 138 of the portable device 120.

The display screen 138 may be utilized to present one or more application HMIs. In one embodiment, the virtual communication application 106 may communicate with the processor 136 to operably control the display screen 138 to present an evaluation user interface to the third party evaluator. The evaluation user interface may include an image/video viewer that may present a live or recorded session of virtual interpersonal communication between the user 104 and the virtual avatar 108*a* of the target individual 108.

The evaluation user interface may additionally include one or more feedback user interface input icons/text boxes that may allow the third party evaluator to provide feedback that may include a rating that may apply to a quality of the (replicated) personality of the virtual avatar 108*a* of the target individual 108 with respect to the (real) personality of the 108 of the target individual 108. In some configurations, the portable device 120 may also be configured to utilize the voice recognition system (of the portable device 120) to receive and determine feedback from the third party evaluator through vocal feedback provided by the third party evaluator.

For example, the third party evaluator may provide feedback that a particular recorded instance of virtual interpersonal communication between the user 104 and the virtual avatar 108*a* needs to be improved with respect to a response pattern of the virtual avatar 108*a*. As discussed below, the feedback provided by the third party evaluator may be utilized by the application 106 to update the data set of contextual data points and/or associated behavioral attributes associated with the target individual 108 and/or the user 104 that may be stored on the neural network 110.

In one embodiment, the processor 136 of the portable device 120 may be operably connected to a storage unit 140. The storage unit 140 may store one or more operating systems, applications, associated operating system data, application data, application user interface data, and the like that are executed by the processor 136 and/or one or more applications including the virtual communication application 106. In one embodiment, the storage unit 140 of the portable device 120 may store a profile that is stored by the virtual communication application 106.

The profile may be associated with the third party evaluator that is using the portable device 120 to provide feedback. The profile may be utilized to store information associated with the third party evaluator that may include, but may not be limited to, a name, address, description, bank account information (for evaluation remuneration purposes), and the like that may be utilized by the application 106 to identify and remunerate the third party evaluator (based on a predetermined rate).

In an exemplary embodiment, the processor 136 may additionally be operably connected to a communication unit 142 of the portable device 120. The communication unit 144 may include antennas and components that may be utilized for wired and wireless computer connections and communications via various protocols. The communication unit 142 may be capable of providing a wireless system (e.g., IEEE 802.11, IEEE 802.15.1 (Bluetooth®)), a near field communication system (NFC) (e.g., ISO 13157), a local area network (LAN), a wide area network (WAN), a point-to-point system, a circuit switching system, a packet switching system, a cellular network system (e.g., CDMA, GSM, LTE, 3G, 4G), a universal serial bus, and the like.

In one embodiment, the communication unit 142 may be configured to wirelessly communicate with the communication unit 134 of the vehicle 102 to send and receive data associated with one or more applications including the virtual communication application 106. The communication unit 142 may also be configured to wirelessly communicate with a communication unit 144 of the external server 112 to send and receive data associated with one or more applications including the virtual communication application 106.

With particular reference to the external server 112, the server 112 may host a plurality of computing systems, databases, and engines (e.g., internet/web search engines) that may be accessed by the application 106 to evaluate and determine the contextual data points of the user 104 and the target individual 108 during the course of one-to-one interpersonal communication and/or between the user 104 and the virtual avatar 108a of the target individual 108 during the course of virtual interpersonal communication.

In one embodiment, the external server 112 includes a processor 146 for providing processing and computing functions. The processor 146 may be configured to control one or more components of the external server 112. The processor 136 may also be configured to execute one or more applications including the virtual communication application 106. In one embodiment, the processor 146 may be configured to operably control the neural network 110 stored on a memory 148 of the external server 112. In alternate embodiments, the neural network 110 or specific subsets (not shown) of the neural network 110 may also be hosted and/or executed by the vehicle 102 or the portable device 120.

In one or more embodiments, the processor 146 of the external server 112 may include one or more machine learning sub-processors (not shown) that may execute various types of machine learning methods and/or deep learning methods that may be utilized to build and maintain a neural network machine learning database 150 to train the neural network 110 to provide artificial intelligence capabilities. The neural network 110 may utilize the processor 146 to process a programming model which enables computer based learning that is based on one or more forms of data that are provided to the neural network 110 through training and/or learned by the neural network 110. The processor 146 may thereby process information that is provided as inputs and may utilize the neural network machine learning database 150 to access stored machine learned data to provide various functions.

In particular, the neural network 110 may be trained by the application 106 during the training mode and the evaluation mode of the application 106 to add and/or update (add substance) to one or more contextual data points associated with various topics of interpersonal communication between the user 104 and the target individual 108. Additionally, the neural network 110 may be trained to add and/or further define one or more behavioral attributes of the target individual 108 that are associated with the respective contextual data points associated with various topics of interpersonal communication between the user 104 and the target individual 108. Accordingly, during the training mode and/or the execution mode of the virtual communication application 106, the neural network machine learning database 150 may be populated (at specific records) with the one or more contextual data points and one or more respective associated behavioral attributes of the target individual 108 and/or the user 104.

In one embodiment, during the execution mode of the application 106, the neural network machine learning database 150 may be accessed based on one or more determined contextual data points of the virtual interpersonal communication between the user 104 and the virtual avatar 108a of the target individual 108. In particular, based on initial statements provided by the user 104, the application 106 may determine one or more contextual data points of the virtual interpersonal communication and may thereby access the neural network 110 to determine a virtual response pattern (e.g., pattern of speech provided by the virtual avatar 108a) based on one or more matching (e.g., within a predetermined error threshold) contextual data points and one or more associated behavioral attributes to be exhibited by the virtual avatar 108a during the virtual interpersonal communication with the user 104. The application 106 may continually determine contextual data points and associated behavioral attributes of the on-going virtual interpersonal communication and may provide virtual response patterns and behavioral attributes that are provided/exhibited by the virtual avatar 108a to carry on the virtual interpersonal communication with the user 104 until the virtual interpersonal communication ends.

In an exemplary embodiment, the communication unit 144 of the external server 112 may be configured to wirelessly connect to an internet cloud. In particular, the communication unit 144 may be capable of providing a wireless system (e.g., IEEE 802.11, IEEE 802.15.1 (Bluetooth®)), a near field communication system (NFC) (e.g., ISO 13157), a local area network (LAN), a wide area network (WAN), a point-to-point system, a circuit switching system, a packet switching system, a cellular network system (e.g., CDMA, GSM, LTE, 3G, 4G), a universal serial bus, and the like.

In one embodiment, the communication unit 144 may be configured to wirelessly communicate with the communication unit 134 of the vehicle 102 (e.g., through the internet cloud) to send and receive data associated with one or more applications including the virtual communication application 106. The communication unit 144 may also be configured to wirelessly communicate with the communication unit 142 of the portable device 120 to send and receive data associated with one or more applications including the virtual communication application 106.

In one or more embodiments, the communication unit 144 may be configured to receive data regarding the contextual data points and associated behavioral attributes associated with the user 104 and the target individual 108. Additionally, the communication unit 144 may send data regarding contextual data and behavioral attributes associated with the virtual avatar 108a of the target individual 108 that may be utilized by the application 106 to present the virtual avatar 108a of the target individual 108 during the execution mode of the virtual communication application 106.

The Virtual Interpersonal Communication Application and Methods Executed by the Application The components of the virtual communication application 106 will now be described according to an exemplary embodiment and with reference to FIG. 1. In an exemplary embodiment, the virtual communication application 106 may be stored on the storage unit 130 of the vehicle 102. In alternate embodiments, the virtual communication application 106 may also/alternatively be stored on the memory 148 of the external server 112 and/or the storage unit 140 of the portable device 120.

In an exemplary embodiment, the virtual communication application 106 may include a plurality of modules, that may include, but may not be limited to, a contextual data point determinant module (contextual determinant module) 152, a behavioral attribute determinant module (behavioral determinant module) 154, a virtual communication output module (virtual output module) 156, and an objective evaluation determinant module (evaluation determinant module) 158.

In one embodiment, the contextual determinant module 152 may be configured to determine contextual data points that are respectively associated with the user 104 and the target individual 108 as determined during a particular instance (e.g., session) of one-to-one interpersonal communication between the user 104 and the target individual 108 during the training mode of the application 106. The contextual determinant module 152 may additionally be configured to determine contextual data points associated with the user 104 based on statements made during a particular instance of virtual interpersonal communication between the user 104 and the virtual avatar 108a of the target individual 108 during the execution mode of the application 106.

In one or more embodiments, the behavioral determinant module 154 may be configured to determine behavioral attributes that are respectively associated with the user 104 and the target individual 108 as determined during the particular instance of the one-to-one interpersonal communication between the user 104 and the target individual 108 during the training mode of the application 106. The behavioral determinant module 154 may additionally be configured to determine one or more behavioral attributes associated with the user 104 based on behaviors exhibited as statements are made by the user 104 during a particular instance of virtual interpersonal communication between the user 104 and the virtual avatar 108a of the target individual 108.

In one or more embodiments, the behavioral determinant module 154 may also be configured to utilize machine learning executed by the neural network 110 to associate one or more of the behavioral attributes to one or more of the contextual data points to thereby associate certain physiological characteristics and emotional characteristics of the target individual 108 and/or the user 104 to a particular contextual data point (e.g., content, topic, sub-topic, etc.) associated with the user 104 and/or the target individual 108. Additionally, as discussed below, the behavioral determinant module 154 may communicate the contextual data points and associated behavioral attributes to the neural network 110 to train the neural network 110 by populating the neural network machine learning database 150 with associated data. The training of the neural network 110 allows the virtual communication application 106 to utilize the neural network 110 to provide the virtual interpersonal communication between the user 104 and the virtual avatar 108a of the target individual 108 during the execution mode of the application 106.

During the execution mode, the application 106 may be configured to determine when the user 104 is communicating with the virtual avatar 108a of the target individual 108 based on the analysis of the user's speech and/or the determination of the target individual's absence within the vehicle 102. Upon determining that the user 104 is communicating with the virtual avatar 108a, the virtual output module 156 may be configured to communicate with the contextual determinant module 152 to determine contextual data points associated with the user's communications (e.g., speech, statements, commands, questions, etc.) with the virtual avatar 108a. The virtual output module 156 may also be configured to communicate with the behavioral determinant module 154 to additionally determine one or more behavioral attributes of the user 104 that may be associated with the contextual data points, as determined by the contextual determinant module 152.

As discussed in more detail below, the virtual output module 156 may be configured to communicate with the neural network 110 to determine one or more matching stored contextual data points (stored during training of the neural network 110) based on (past) one-to-one interpersonal communications with the target individual 104). In some embodiments, the virtual output module 156 may be configured to communicate with the neural network 110 to determine one or more matching behavioral attributes associated with the user 104. The neural network 110 may provide one or more matching contextual data points associated with the response pattern of the target individual 108 based on the context of the user's communication.

The neural network 110 may additionally provide one or more associated behavioral attributes associated with the one or more matching contextual data points that are associated with the target individual 108. The virtual output module 156 may thereby present the virtual avatar 108a of the target individual 108 as virtually communicating with the user 104 using verbal responses in accordance with the response pattern of the target individual 108 and exhibiting physiological characteristics and emotional characteristics similar to the target individual 108 (e.g., that the target individual 108 would exhibit during one-to-one interpersonal communications with the user 104 of a similar context, etc.).

In one embodiment, during the evaluation mode of the virtual communication application 106, the evaluation determinant module 158 may be configured to present the evaluation user interface to each third party evaluator using the portable device 120. The third party evaluator may be a third party independent/objective (pre-selected) individual that may or may not personally know the user 104 and/or the target individual 108. The evaluation determinant module 158 may be configured to present an image/video viewer through the evaluation user interface that may present a real-time or recorded session of virtual interpersonal communication between the user 104 and the virtual avatar 108a of the target individual 108.

The evaluation determinant module 158 may also be configured to receive evaluation inputs that are provided by the third party evaluator through one or more feedback user interface input icons/text boxes that may include ratings that may be provided to apply towards one or more instances of time of the virtual interpersonal communication(s). In particular, the ratings (e.g., 1-100 values) may apply to a quality of the (replicated) personality of the virtual avatar 108a of the target individual 108 that may be determined by the statements (e.g., responses) made by the virtual avatar 108a of the target individual 108 and/or the behavioral responses exhibited by the virtual avatar 108a of the target individual 108.

In some embodiments, the evaluation inputs may be provided in comparison with the (real) personality of the target individual 108 based on one or more sessions of one-to-one interpersonal communication between the user 104 and the target individual 108. As discussed below, the evaluation determinant module 158 may determine that the evaluation received by the third party evaluator may include ratings that fall below a predetermined threshold or that the evaluation includes one or more improvement suggestions. The evaluation determinant module 158 may thereby access the neural network 110 to communicate updated contextual data points and/or associated behavioral attributes based on the evaluation received by the third party evaluator.

In one or more configurations of the application 106, the evaluation determinant module 158 may also set a remuneration value based on one or more factors that may include, but may not be limited to, a length of the virtual interpersonal communication session viewed by the third party evaluator, a number of evaluations completed by the third party evaluator, an amount of feedback provided by the third party evaluator, and the like. Upon analyzing the evaluation of a particular session(s) of virtual interpersonal communication, the evaluation determinant module 158 may set the remuneration value (e.g., dollar amount) and may process a payment to the third party evaluator based on the set remuneration value.

With reference to the enablement of the application 106, the training mode of the application 106 may be enabled after the user 104 has created an associated user profile and a target individual profile that is associated with the target individual 108 through the setup interface of the application 106 presented on the display unit 118. Upon setting up the respective profiles, in some embodiments, the virtual communication application 106 may prompt the user 104 and the target individual 108 to engage in one-to-one communication to thereby capture images/video of the user 104 and the target individual 106 (seated within specified seats of the vehicle 102) and vocal data associated with the user 104 and the target individual 108.

In particular, the virtual communication application 106 may communicate with the camera system 128 of the vehicle 102 to capture image data based on images/videos associated the user 104 and the target individual 108, as captured by the plurality of cameras within the vehicle 102. The application 106 may additionally communicate with the voice recognition system 124 to capture vocal data as sensed by the microphone(s) within the vehicle 102.

In one embodiment, the images/video of the user 104 and/or the vocal data may be utilized by the application 106 to determine that one-to-one interpersonal communication is occurring between the user 104 and the target individual 108 within the vehicle 102. The application 106 may accordingly enable/re-enable the training mode of the application 106 to train the neural network 110 with new/additional contextual data points associated with the one-to-one interpersonal communication and/or update stored contextual data points (stored on the neural network machine learning database 150) that match contextual data points that are determined based on the current one-to-one interpersonal communication.

Figure 3:
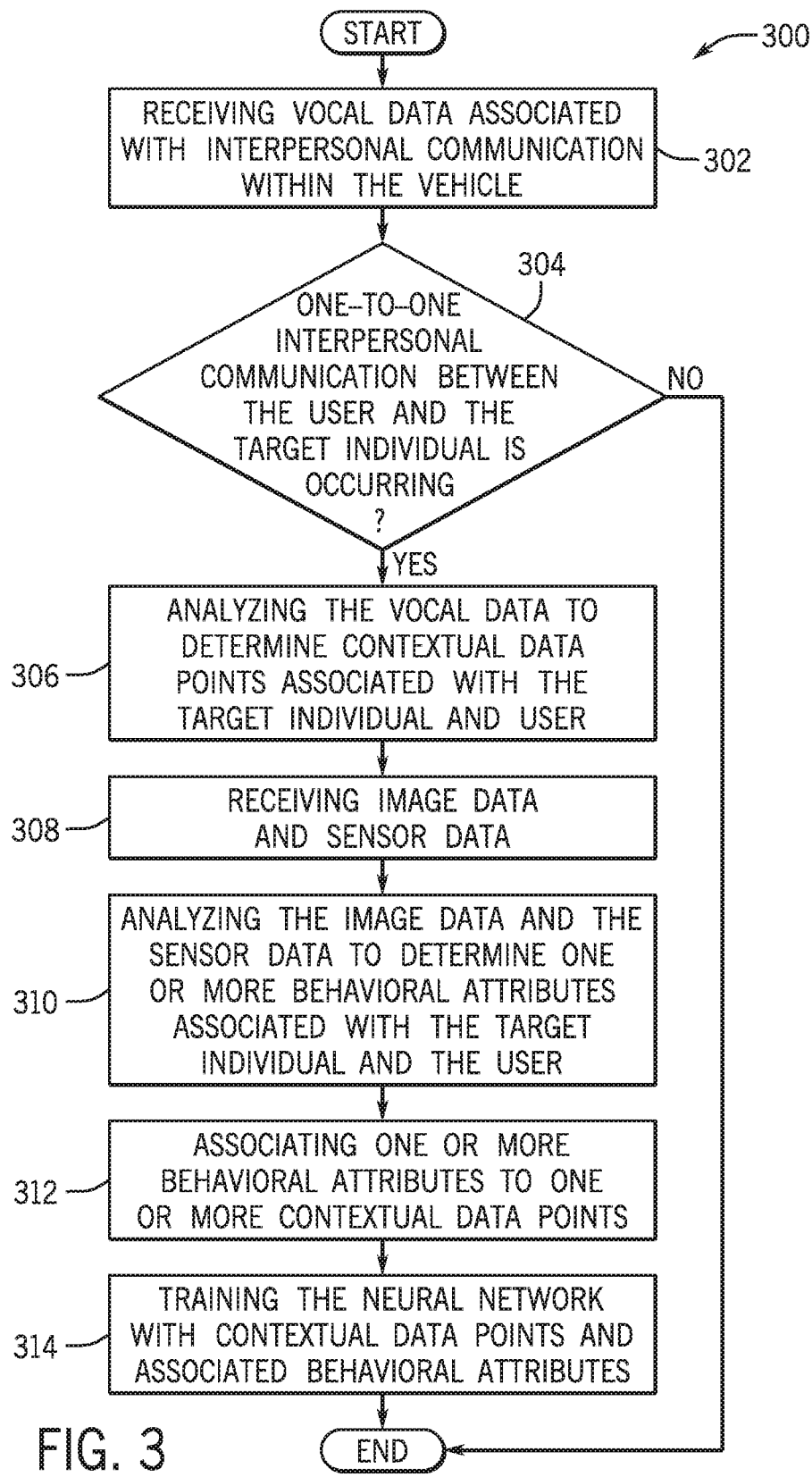
FIG. 3 is a process flow diagram of a method that pertains to a training mode of a virtual communication application according to an exemplary embodiment.

FIG. 3 is a process flow diagram of a method 300 that pertains to the training mode of the virtual communication application 106 according to an exemplary embodiment. FIG. 3 will be described with reference to the components of FIG. 1 though it is to be appreciated that the method 300 of FIG. 3 may be used with other systems and/or components. The method 300 may begin at block 302, wherein the method 300 may include receiving vocal data associated with interpersonal communication within the vehicle 102. As discussed above, the training mode of the application 106 may be enabled after the user 104 has created an associated user profile and a target individual profile that is associated with the target individual 108 through the setup interface of the application 106 presented on the display unit 118.

During the training mode, the contextual determinant module 152 may be configured to communicate with the voice recognition system 124 to capture vocal data within the vehicle 102 based on sounds captured by one or more of the microphones. More specifically, the voice recognition system 124 may be configured to locate human speech patterns upon receiving an activation signal from the application 106. In one embodiment, upon locating human speech patterns, the voice recognition system 124 may be configured to capture the voice, speech patterns, and vocal inflections of one or more individuals that may be speaking to one another to capture live interpersonal communication. The captured voice, speech patterns, and vocal inflections may be captured and stored as vocal data that may be further analyzed by the contextual determinant module 152.

The method 300 may proceed to block 304, wherein the method 300 may include determining if one-to-one interpersonal communication between the user 104 and the target individual 108 is occurring. As discussed above, during setup, the virtual communication application 106 may utilize the voice recognition system 124 to learn and store respective vocal data associated with the user 104 and the target individual 108 within respective voice recognition data files onto a storage unit 130 of the vehicle 102. The application 106 may be configured to link a respective voice recognition data file to the user 104 and a respective voice recognition data file to the target individual 108 to be utilized to determine live interpersonal communication between the user 104 and the target individual 108 and identify the user 104 and/or the target individual 108.

In one embodiment, the contextual determinant module 152 may be configured to access the storage unit 130 of the vehicle 102 to access the stored voice recognition data files associated with the user 104 and the target individual 108. The contextual determinant module 152 may further analyze real-time vocal data (received at block 302) against the voice recognition data file(s) and may thereby determine if the user 104 is conducting (e.g., speaking) one-to-one interpersonal communication with the target individual 108.

If it is determined that one-to-one interpersonal communication between the user 104 and the target individual 108 is occurring (at block 304), the method 300 may proceed to block 306, wherein the method 300 may include analyzing the vocal data to determine contextual data points associated with the target individual 108 and the user 104. In an exemplary embodiment, the contextual determinant module 152 may communicate with the voice recognition system 124 to receive a generated textual or other simple representation of one or more words in the form of voice inputs to be provided to the contextual determinant module 152.

In some embodiments, the voice recognition system 124 may generate multiple possible words or phrases such as when the voice recognition system 124 may not resolve the spoken word or phrase with 100% certainty. In such embodiments, the voice recognition system 124 may provide possible phrases in the form of voice inputs to the contextual determinant module 152. The voice recognition system 124 may also provide a "confidence value" within the voice inputs for each such possible phrase indicating how confident the voice recognition system 124 is that each possible phrase was the actual phrase spoken.

In one embodiment, upon receiving data pertaining to the voice inputs respectively associated with the user 104 and the target individual 108, as captured during the course of the one-to-one interpersonal communication, the contextual determinant module 152 may analyze the voice inputs and may perform speech pattern recognition on the voice inputs associated with the user 104 to determine contextual data points pertaining to the content, one or more categories of context, one or more subcategories of context, one or more sub-topics, one or more event references, and/or one or more point of interest references that the user 104 may engage in during the one-to-one interpersonal communication.

Additionally, the contextual determinant module 152 may analyze the voice inputs associated with the target individual 108 to determine contextual data points pertaining to the content, one or more categories of context, one or more subcategories of context, one or more sub-topics, one or more event references, and/or one or more point of interest references that the target individual 108 may engage in during the one-to-one interpersonal communication (e.g., based on responses, statements, and/or questions spoken by the target individual 108 during the course of the one-to-one interpersonal communication).

In particular, the contextual determinant module 152 may communicate with the neural network 110 to utilize the processor 146 of the external server 112 to execute multimodal processing and/or machine learning to perform the speech pattern recognition to determine the contextual data points associated with the user 104 and the target individual 108. Upon determining the contextual data points associated with the user 104 and the target individual 108 as determined on the one-to-one interpersonal communication, the contextual determinant module 152 may communicate data pertaining to the contextual data points to the behavioral determinant module 154 of the virtual communication application 106.

The method 300 may proceed to block 308, wherein the method 300 may include receiving image data and sensor data. In an exemplary embodiment, the behavioral determinant module 154 may be configured to communicate with the camera system 128 to capture images/video of the user 104 and the target individual 108 during the course of the one-to-one interpersonal communication and to communicate respective image data to the behavioral determinant module 154. As discussed above, the plurality of cameras of the camera system 128 may be configured to capture particular emotional characteristics of the user 104 and the target individual 108.

The behavioral determinant module 154 may additionally be configured to communicate with the plurality of sensors 126 to capture sensor data (e.g., physiological data). As discussed above, the plurality of sensors 126 may be configured to capture particular physiological characteristics associated with the user 104 and the target individual 108. The plurality of sensors 126 may be configured to output one or more data signals in the form of the sensor data indicating one or more measurements of data sensed by the plurality of sensors 126 with respect to the user 104 and the target individual 108 which may be received by the behavioral determinant module 154 to be further analyzed.

The method 300 may proceed to block 310, wherein the method 300 may include analyzing the image data and the sensor data to determine one or more behavioral attributes associated with the target individual 108 and the user 104. In an exemplary embodiment, the behavioral determinant module 154 may be configured to analyze the image data pertaining to the images/video of the user 104 and the target individual 108 captured during the course of the one-to-one interpersonal communication. The behavioral determinant module 154 may thereby communicate with the neural network 110 to perform machine learning image analysis to thereby determine emotional characteristics that may include, but may not be limited to, facial expressions (reactions), body movements, body language and the like that may be respectively associated with the user 104 and the target individual 108.

The behavioral determinant module 154 may also be configured to analyze the sensor data pertaining to the one or more measurements of data sensed by the plurality of sensors 126 with respect to the user 104 and the target individual 108 captured during the course of the one-to-one interpersonal communication. The behavioral determinant module 154 may thereby communicate with the neural network 110 to perform machine learning sensor analysis to thereby determine physiological characteristics that may include, but may not be limited to, pupil dilatation, breathing rate, blinking rate, heart rate, muscle movements, and the like that may be respectively associated with the user 104 and the target individual 108.

In an exemplary embodiment, upon determining the emotional characteristics and the physiological characteristics, the behavioral determinant module 154 may utilize the neural network 110 to aggregate and codify the emotional characteristics (data) and the physiological characteristics (data) that may be respectively associated with the user 104 and the target individual 108. The emotional characteristics (data) and the physiological characteristics (data) may be aggregated and codified into one or more behavioral attributes associated respectively to the target individual 108 and the user 104.

The method 300 may proceed to block 312, wherein the method 300 may include associating one or more behavioral attributes to one or more contextual data points. In one or more embodiments, the behavioral determinant module 154 may analyze the contextual data points and the behavioral attributes associated with the user 104 to determine particular behavioral attributes that are simultaneously captured at one or more points in time that particular contextual data points are captured. The behavioral determinant module 154 may also analyze the contextual data points and behavioral attributes associated with the target individual 108 to determine particular behavioral attributes that are simultaneously captured at one or more points in time that particular contextual data points are captured.

Stated differently, the behavioral determinant module 154 may determine behavioral attributes that include emotional characteristics and physiological characteristics that are simultaneously exhibited respectively by the user 104 and the target individual 108 as the user 104 and the target individual 108 communicate particular content, one or more categories of context, one or more subcategories of context, one or more sub-topics, one or more event references, and/or one or more point of interest references that are included within the contextual data points during the course of one-to-one interpersonal communication. In one embodiment, the behavioral determinant module 154 may associate (e.g., link) the particular contextual data points simultaneously captured with the particular behavioral attributes that are respectively associated with the user 104 and the target individual 108. In some embodiments, the associated contextual data points and behavioral attributes may be merged into one or more aggregated data packets that may be further analyzed by the application 106 during the execution mode of the application 106, as discussed below.

The method 300 may proceed to block 314, wherein the method 300 may include training the neural network 110 with contextual data points and associated behavioral attributes. In one or more embodiments, upon associating the one or more behavioral attributes to one or more contextual attributes, the behavioral determinant module 154 may communicate data pertaining to the associated contextual data points and behavioral attributes that are respectively associated to the user 104 and the target individual 108 to the neural network 110. The neural network 110 may analyze the data and may access the neural network machine learning database 150 to store the data pertaining to the contextual data points and associated behavioral attributes to thereby add to a data set associated with the one-to-one interpersonal communication (session) between the user 104 and the target individual 108.

The neural network 110 may thereby utilize deep learning techniques to be trained (or further trained) with respect to the particular content, one or more categories of context, one or more subcategories of context, one or more sub-topics, one or more event references, and/or one or more point of interest references that may be spoken by the user 104 and the target individual 108 and associated emotional characteristics and physiological characteristics that may be simultaneously and respectively exhibited by the user 104 and the target individual 108. Accordingly, the neural network 110 may be (further) trained with contextual response patterns and associated emotional responses and physiological characteristics of the user 104 and the target individual 108 that pertain to the particular content, one or more categories of context, one or more subcategories of context, one or more sub-topics, one or more event references, and/or one or more point of interest references that may be utilized during the execution mode to facilitate the virtual interpersonal communication between the user 104 and the virtual avatar 108a of the target individual 108.

Figure 4:
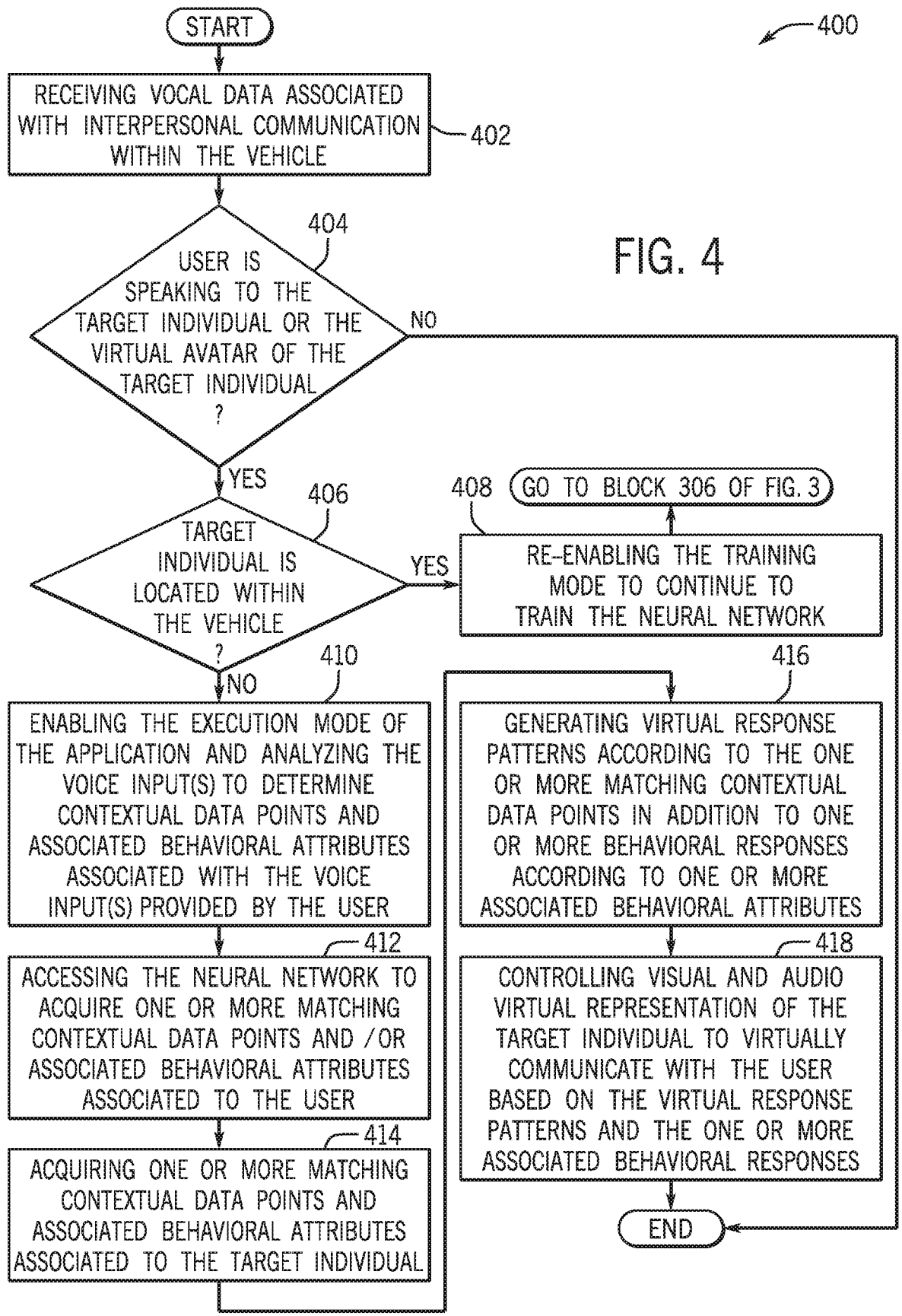
FIG. 4 a process flow diagram of a method that pertains to an execution mode of the virtual communication application according to an exemplary embodiment.

FIG. 4 is a process flow diagram of a method 400 that pertains to the execution mode of the virtual communication application 106 according to an exemplary embodiment. FIG. 4 will be described with reference to the components of FIG. 1 though it is to be appreciated that the method 400 of FIG. 4 may be used with other systems and/or components. The method 400 may begin at block 402, wherein the method 400 may include receiving vocal data associated with interpersonal communication within the vehicle 102. In one embodiment, the contextual determinant module 152 may be configured to communicate with the voice recognition system 124 to capture vocal data within the vehicle 102 based on sounds captured by one or more of the microphones.

The voice recognition system 124 may thereby analyze voices in the form of vocal data that is sensed by the microphone(s). The voice recognition system 124 may be configured to locate human speech patterns upon receiving an activation signal from the application 106. In one embodiment, upon locating human speech patterns, the voice recognition system 124 may be configured to capture the voice, speech patterns, and vocal inflections of one or more individuals that may be speaking within the vehicle 102 to capture live interpersonal communication. The captured voice, speech patterns, and vocal inflections may be captured and stored as vocal data that may be further analyzed by the contextual determinant module 152.

The method 400 may proceed to block 404, wherein the method 400 may include determining if the user 104 is speaking with the target individual 108 or the virtual avatar 108a of the target individual 108. In one embodiment, the contextual determinant module 152 may be configured to access the storage unit 130 of the vehicle 102 to access the stored voice recognition data files associated with the user 104. The contextual determinant module 152 may further analyze real-time vocal data (received at block 302) against the voice recognition data file(s) and may thereby determine that the user 104 is speaking within the vehicle 102.

In one embodiment, upon determining that the user 104 is speaking within the vehicle 102, the contextual determinant module 152 may communicate with the voice recognition system 124 to sense a particular trigger phrase that may be spoken by the user 104 that pertains to communication with the target individual 108 and/or the virtual avatar 108a. For example, the user 104 may speak the target individual's name and/or a nickname assigned to the virtual avatar 108a that may be interpreted as a respective trigger phrase (as stored within a profile associated with the target individual 108).

If the voice recognition system 124 recognizes that the trigger phrase is spoken by the user 104, the voice recognition system 124 may communicate respective data to the contextual determinant module 152. Based on received respective data, the contextual determinant module 152 may thereby determine that the user 104 is speaking to the target individual 108 or the virtual avatar 108a of the target individual 108a.

The method 400 may proceed to block 406, wherein the method 400 may include determining if the target individual 108 is located within the vehicle 102. In an exemplary embodiment, upon determining that the user 104 is speaking to the target individual 108 or the virtual avatar 108a of the target individual 108, the contextual determinant module 152 may communicate with the camera system 128 of the vehicle 102 to determine if the target individual 108 is physically located within the vehicle 102. In particular, the contextual determinant module 152 may communicate with the camera system 128 of the vehicle 102 to capture image data based on images/videos of the seats of the vehicle 102, as captured by the plurality of cameras within the vehicle 102. As discussed above, during the training mode of the application 106, the plurality of cameras of the camera system 128 may capture images/video of the user 104 and the target individual 106 (seated within specified seats of the vehicle 102) that may be stored on the storage unit 130.

In one configuration, the contextual determinant module 152 may receive the image data associated with the images/video of the seats of the vehicle 102 and may execute camera logic (e.g., executable software) to analyze the images/video of the seats of the vehicle 102 to determine if the target individual 106 is located within the vehicle 102 based on the stored images/video of the target individual 106 captured during the training mode of the application 106.

In another configuration, the contextual determinant module 152 may communicate a command to the behavioral determinant module 154 to analyze one or more stored behavioral attributes to determine if the target individual 110 is located within the vehicle 102. Upon receiving the command, the behavioral determinant module 154 may be configured to access the neural network 110 to retrieve one or more behavioral attributes stored on the neural network machine learning database 150. The behavioral determinant module 154 may additionally communicate respective image data to the contextual determinant module 152. The contextual determinant module 152 may execute camera logic (e.g., executable software) with respect to the images/video of the seats of the vehicle 102 to analyze the images/video of the seats of the vehicle 102 to determine if the target individual 106 is located within the vehicle 102.

In yet another configuration, the contextual determinant module 152 may be configured to access the storage unit 130 of the vehicle 102 to access the stored voice recognition data files associated with the target individual 108. The contextual determinant module 152 may further analyze real-time vocal data against the voice recognition data file(s) and may thereby determine if the target individual 108 speaks to the user 104 to determine if the target individual 108 is located within the vehicle 102 (or is remotely communicating with the user 104 through a telecommunications system (not shown) of the vehicle 102).

If it is determined that the target individual 108 is located within the vehicle 102 (at block 406), the method 400 may proceed to block 408, wherein the method 400 may include re-enabling the training mode of the application 106 to continue to train the neural network 110. In an exemplary embodiment, the virtual communication application 106 may start executing the method 300 at block 306 to further analyze vocal data associated with the one-to-one communication between the user 104 and the target individual 108. The re-enablement of the training mode may function to further train the neural network 110 with one or more contextual data points and associated behavioral attributes to broaden the amount of data that may be utilized to provide the virtual interpersonal communication between the user 104 and the virtual avatar 108a of the target individual 108 during the execution mode of the application 106.

If it is determined that the target individual 108 is not located within the vehicle 102 (at block 406), the method 400 may proceed to block 410, wherein the method 400 may include enabling the execution mode of the application 106 and determining contextual data points and associated behavioral attributes associated with the voice input(s) provided by the user 104. In an exemplary embodiment, the contextual determinant module 152 may communicate with the voice recognition system 124 to receive a generated textual or other simple representation of one or more words in the form of voice inputs to be provided to the contextual determinant module 152.

In one embodiment, upon receiving data pertaining to the voice inputs respectively associated with the user 104, as captured based on the user 104 speaking to the virtual avatar 108a of the target individual 108, the contextual determinant module 152 may analyze the voice inputs and may perform speech pattern recognition on the voice inputs associated with the user 104 to determine contextual data points associated to the content, one or more categories of context, one or more subcategories of context, one or more sub-topics, one or more event references, and/or one or more point of interest references that the user 104 may engage in during the virtual interpersonal communication.

In particular, the contextual determinant module 152 may communicate with the neural network 110 to utilize the processor 146 of the external server 112 to execute multi-modal processing and/or machine learning to perform the speech pattern recognition to determine the contextual data points associated with the user 104. Upon determining the contextual data points associated with the user 104 as determined based on the virtual interpersonal communication, the contextual determinant module 152 may communicate data pertaining to the contextual data points to the behavioral determinant module 154 of the virtual communication application 106.

In an exemplary embodiment, upon receiving the data pertaining to the contextual data points, the behavioral determinant module 154 may be configured to analyze image data provided by the camera system 128. The image data may pertain to the images/video of the user 104 captured as the user 104 is speaking to the virtual avatar 108a of the target individual 108 during the course of virtual interpersonal communication. The behavioral determinant module 154 may communicate with the neural network 110 to perform machine learning image analysis to thereby determine emotional characteristics of the user 104 that may include, but may not be limited to, facial expressions (reactions), body movements, body language and the like that may be respectively associated with the user 104 during the course of the virtual interpersonal communication with the virtual avatar 108a of the target individual 108.

The behavioral determinant module 154 may also be configured to analyze the physiological characteristics sensed and provided by the plurality of sensors 126 of the vehicle 102. In particular, the behavioral determinant module 154 may communicate with the neural network 110 to perform machine learning sensor analysis to thereby determine the physiological characteristics of the user 104 that may include, but may not be limited to, pupil dilatation, breathing rate, blinking rate, heart rate, muscle movements, and the like that may be respectively associated with the user 104.

In an exemplary embodiment, upon determining the emotional characteristics and the physiological characteristics of the user 104, the behavioral determinant module 154 may utilize the neural network 110 to aggregate and codify the emotional characteristics (data) and the physiological characteristics (data) that may be respectively associated with the user 104 into one or more behavioral attributes associated respectively with the user 104 (during the course of the virtual interpersonal communication as determined during the execution mode of the application 106).

Stated differently, the behavioral determinant module 154 may determine behavioral attributes that include emotional characteristics and physiological characteristics that are respectively exhibited by the user 104 during the course of the virtual interpersonal communication as the user 104 communicates particular content, one or more categories of context, one or more subcategories of context, one or more sub-topics, one or more event references, and/or one or more point of interest references that are included within the contextual data points.

In one embodiment, upon determining the behavioral attributes associated with the user 104 during the virtual interpersonal communication, the behavioral determinant module 154 may associate the particular contextual data points simultaneously captured with the particular behavioral attributes that are respectively associated with the user 104. In some embodiments, the associated contextual data points and behavioral attributes may be merged into one or more aggregated data packets. In one embodiment, the contextual data points and associated behavioral attributes and/or the aggregated data packets may be communicated by the behavioral determinant module 154 to the virtual output module 156 to be further analyzed.

The method 400 may proceed to block 412, wherein the method 400 may include accessing the neural network 110 to acquire one or more matching contextual data points and/or associated behavioral attributes associated to the user 104. In one embodiment, the virtual output module 156 may access the neural network 110 on the external server 112 to query the neural network machine learning database 150 to retrieve one or more contextual data points and/or associated behavioral attributes determined during one-to-one interpersonal communication (as determined during the training mode of the application 106, discussed above with respect to the method 300 of FIG. 3) that match (within a predetermined error threshold) the contextual data points and associated behavioral attributes of the user 104 that are determined at block 410. Upon retrieving one or more contextual data points and/or one or more associated behavioral attributes, the neural network 110 may communicate respective data to the virtual output module 156.

The method 400 may proceed to block 414, wherein the method 400 may include acquiring one or more matching contextual data points and associated behavioral attributes associated to the target individual 108. In one embodiment, the virtual output module 156 may utilize data (accessed at block 412) from past (live) one-to-one interpersonal communication(s) with the target individual 108 to provide simulated responses to the user 104 that replicate the real responses provided by the target individual 108. The simulated responses may be based on the statements of the user 104 (captured during the training mode and the execution mode), statements/responses of the target individual 108 (captured during the training mode), the physical characteristics of the user 104 (captured during the training mode and the execution mode), the physical characteristics of the target individual 108 (captured during the training mode), the emotional characteristics of the user 104 (captured during the training mode and the execution mode), and/or the emotional characteristics of the user target individual 108 (captured during the training mode).

More specifically, the virtual output module 156 may access the neural network 110 to acquire one or more matching contextual data points and/or associated behavioral attributes to the target individual 108. The neural network 110 may query the neural network machine learning database 150 to retrieve one or more contextual data points and/or associated behavioral attributes that were determined during one-to-one interpersonal communication that match (within a predetermined error threshold) the contextual data points and associated behavioral attributes of the target individual 108 captured at similar points in time as the contextual data points and/or the associated contextual data points of the user 104 (captured during the execution mode), as acquired at block 412.

Upon retrieving one or more contextual data points and/or one or more associated behavioral attributes associated with the target individual 108, the neural network 110 may communicate respective data to the virtual output module 156. This functionality may allow the virtual output module 156 to determine a content, one or more categories of context, one or more subcategories of context, one or more sub-topics, one or more event references, and/or one or more point of interest references of responses/statements provided by the target individual 108 during the course of the one-to-one interpersonal communications (captured during the training mode) based on the content, one or more categories of context, one or more subcategories of context, one or more sub-topics, one or more event references, one or more point of interest references, associated behavioral attributes, and emotional attributes pertaining to the statements made by the user 104 (as determined at block 410, during the execution mode of the application 106).

Additionally, this functionality may allow the virtual output module 156 to determine physical characteristics and emotional characteristics that were expressed by the target individual 108 that may have been elicited based on the content, one or more categories of context, one or more subcategories of context, one or more sub-topics, one or more event references, one or more point of interest references, associated behavioral attributes, and emotional attributes pertaining to the statements made by the user 104 (based on data pertaining to the contextual data points and associated behavioral attributes associated with the user 104 and captured during the training mode and the execution mode of the application 106).

The method 400 may proceed to block 416, wherein the method 400 may include generating virtual response patterns according to the one or more matching contextual data points (of the target individual 108) in addition to one or more behavioral responses according to one or more associated behavioral attributes (of the target individual 108). In an exemplary embodiment, the virtual output module 156 may utilize the neural network 110 to select one or more contextual data points and associated behavioral attributes from the matching contextual data points and associated behavioral attributes acquired at block 414. In particular, the neural network 110 may extract features by executing one or more deep learning algorithms and methods (e.g., regression analysis) to determine one or more contextual data points and associated behavioral attributes that may be best suited to replicate real responses and/or statements that would be provided by the target individual 108 and associated physiological responses and emotional responses that would be expressed by the target individual 108 during one-to-one interpersonal communication.

In one embodiment, upon selecting one or more contextual data points and associated behavioral attributes, the neural network 110 may communicate respective data to the virtual output module 156. The virtual output module 156 may analyze the one or more selected contextual data points and associated behavioral attributes and generate system instructions (e.g., in the form of executable computer language) that include virtual response patterns to be spoken by the virtual avatar 108*a* of the target individual 108 and one or more behavioral responses to be expressed by the virtual avatar 108*a* of the target individual 108.

The method 400 may proceed to block 418, wherein the method 400 may include controlling a visual and audio virtual representation of the target individual 108 to virtually communicate with the user 104 based on the virtual response patterns and the one or more associated behavioral responses. In an exemplary embodiment, upon generating the virtual response patterns and one or more behavioral responses (at block 416), the virtual output module 156 may communicate data pertaining to the virtual response patterns and one or more associated behavioral responses to the ECU 114 and/or the head unit 116 of the vehicle 102 to utilize the display unit 118 and the speaker system 122 to present a visual and audio representation of the virtual avatar 108*a* of the target individual 108.

In particular, the display unit 118 may be operably controlled to present a physical portrayal of the virtual avatar 108*a* (as illustrated in FIG. 2) that may be presented as a virtual moving image/video of the target individual 108 that may be presented to the user 104 as the virtual interpersonal communication is conducted between the user 104 and the virtual avatar 108*a* of the target individual 108 during the execution mode of the application 106. In other words, the physical portrayal of the virtual avatar 108*a* may be presented to facilitate virtual interpersonal communication between the user 104 and the virtual avatar 108*a* of the target individual 108. Additionally, the speaker system 122 may be operably controlled to utilize the one or more speakers of the speaker system 122 to synthesize the voice of the target individual 108 to allow the virtual avatar 108*a* to communicate to the user 104 during the virtual interpersonal communication. In one or more configurations, the virtual output module 156 may provide commands to the ECU 114 and/or the head unit 116 to operably control the display unit 118 and the speaker system 122 to present the physical portrayal of the virtual avatar 108*a* in synchronization with the synthesized voice of the target individual 108.

As an illustrative example, based on the analysis of a current statement "What do you think I should eat for lunch today?" (as captured by the voice recognition system 124) and behaviors expressed by the user 104 such as hand gestures to the virtual avatar 108*a* (as captured by the camera system 128), the virtual output module 156 may utilize the neural network 110 to acquire stored contextual data points and associated behavioral attributes associated with the statements and behaviors from prior one-to-one interpersonal communications between the user 104 and the target individual 108. The virtual output module 156 may thereby generate virtual response patterns and one or more behavioral responses.

Accordingly, the ECU 114 and/or the head unit 116 may operably control the display unit 118 and the speaker system 122 to present the physical portrayal of the virtual avatar 108*a* in synchronization with the synthesized voice of the target individual 108 by answering "Its Friday, pizza sounds good" (based on the virtual response patterns acquired by the neural network 110 based on stored contextual data points). The virtual avatar 108a may also be presented as expressing excitement through voice inflections, facial expressions, and facial movements (based on the one or more behavioral responses acquired by the neural network 110 based on stored associated behavioral attributes).

Figure 5:
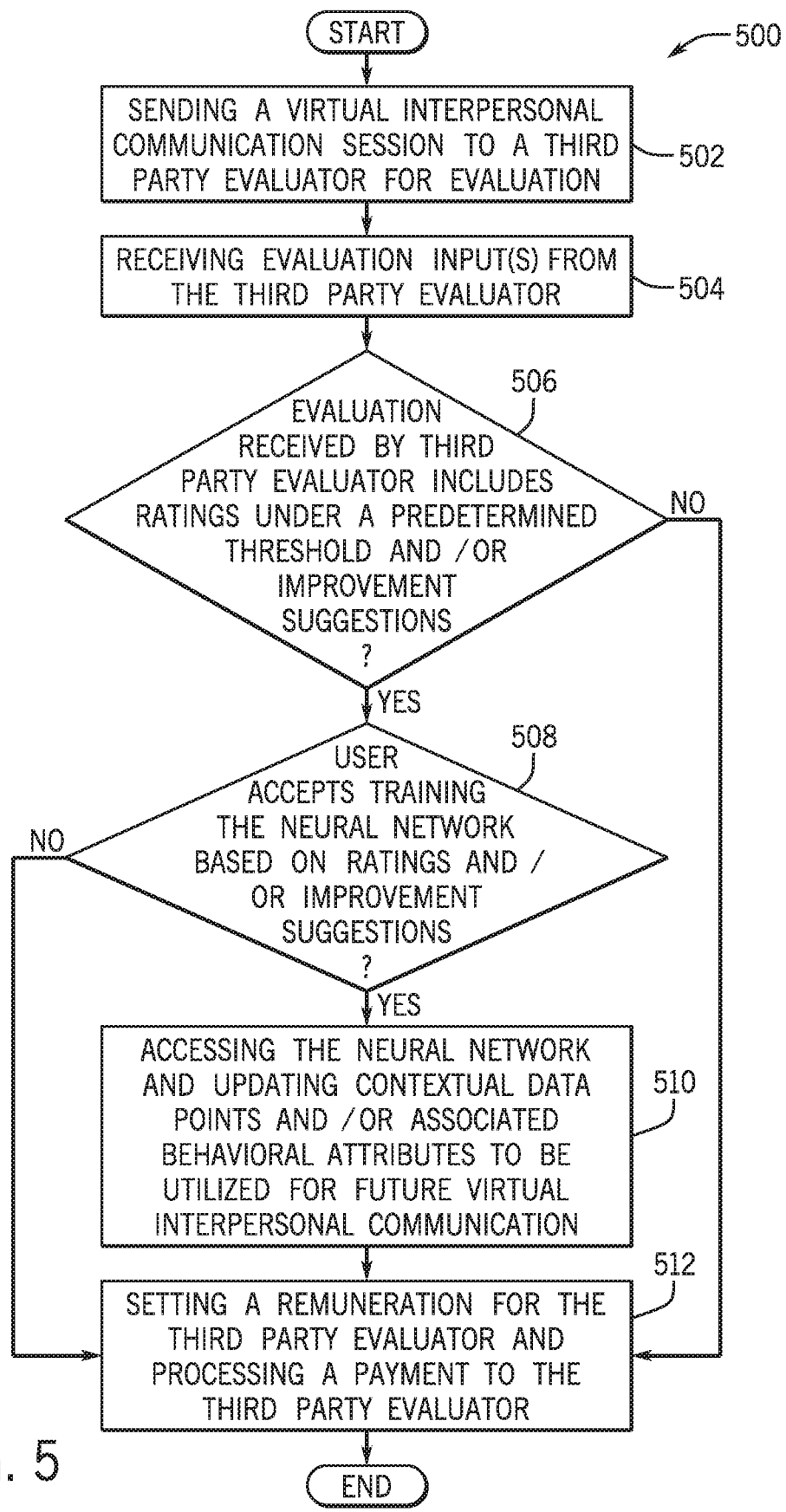
FIG. 5 is a process flow diagram of a method that pertains to an evaluation mode of the virtual communication application according to an exemplary embodiment.

FIG. 5 is a process flow diagram of a method 500 that pertains to the evaluation mode of the virtual communication application 106 according to an exemplary embodiment. FIG. 5 will be described with reference to the components of FIG. 1 though it is to be appreciated that the method 500 of FIG. 5 may be used with other systems and/or components. As discussed above, the evaluation mode of the virtual communication application 106 may allow one or more third-party evaluators that may be pre-selected or may agree to evaluate one or more pre-recorded or live sessions of the virtual interpersonal communication between the user 104 and the virtual avatar 108a. In some cases, the third-party evaluator may also be shown pre-recorded sessions of one-to-one interpersonal communications between the user 104 and the target individual 108a that may include matching contextual data points associated with the user 104 and/or the target individual 108 as a reference point to compare to the virtual interpersonal communication between the user 104 and the virtual avatar 108a of the target individual 108.

In an exemplary embodiment, the method 500 may be utilized by the evaluation determinant module 158 to facilitate an objective evaluation of the virtual interpersonal communication and to further train the neural network 110 when applicable to improve the virtual interpersonal communication when applicable, based on the evaluation provided by the third party evaluator(s). The method 500 may begin at block 502, wherein the method 500 may include sending a virtual interpersonal communication session to a third party evaluator for evaluation.

In an exemplary embodiment, the evaluation determinant module 158 may utilize the communication unit 134 to send data associated with the live (real-time) or prerecorded session(s) of virtual interpersonal communication(s) between the user 104 and the virtual avatar 108a of the target individual 108 to the portable device 120 used by the third party evaluator. Upon receipt of the data by the communication unit 142 of the portable device 120, the processor 136 of the portable device 120 may operably control the display screen 138 to present the evaluation user interface to the third party evaluator. As discussed above, the evaluation user interface may include an image/video viewer that may present the real-time or recorded session(s) of virtual interpersonal communication(s).

In some embodiments, the evaluation determinant module 158 may also be configured to send data associated with the pre-recorded session(s) of one-to-one interpersonal communication(s) between the user 104 and the target individual 108a that may include matching contextual data points associated with the user 104 and/or the target individual 108 as reference to compare to the virtual interpersonal communication between the user 104 and the virtual avatar 108a of the target individual 108. The processor 136 of the portable device 120 may operably control the display screen 138 to present the image/video viewer to present the recorded session(s) of one-to-one interpersonal communication(s) in order for the third party evaluator to compare to the virtual interpersonal communication between the user 104 and the virtual avatar 108a of the target individual 108.

The method 500 may proceed to block 504, wherein the method 500 may include receiving evaluation input(s) from the third party evaluator. In one embodiment, the evaluation user interface may additionally include one or more feedback user interface input icons/text boxes that may allow the third party evaluator to provide feedback that may include ratings (e.g., ratings 1-100 values that may pertain to great, good, medium, or poor evaluations) that may be provided at various points in time during the presentation of the virtual interpersonal communication(s) sessions(s) and may be communicated to the evaluation determinant module 158.

The evaluation user interface may also include one or more feedback user interface input text boxes that allow the third party evaluator to input textual feedback and may be communicated to the evaluation determinant module 158. In some configurations, the portable device 120 may also be configured to utilize the voice recognition system (of the portable device 120) to receive and determine feedback from the third party evaluator through vocal feedback provided by the third party evaluator that may be communicated by the processor 136 to the evaluation determinant module 158. In particular, the ratings and feedback may apply to a quality of the (replicated) personality of the virtual avatar 108a of the target individual 108 with respect to the (real) personality of the 108 of the target individual 108.

The method 500 may proceed to block 506, wherein the method 500 may include determining if the evaluation received by the third party evaluator includes ratings under a predetermined threshold (e.g., a predetermined ratings value) and/or one or more improvement suggestions. In one embodiment, the evaluation determinant module 158 may be configured to analyze the received data of the inputs pertaining to the ratings and may compare the ratings received from the third party evaluator to a predetermined ratings threshold. The evaluation determinant module 158 may thereby determine if the evaluation received by the third party evaluator includes ratings under the predetermined threshold and/or any textual or vocal feedback that have been provided with respect to one or more improvement suggestions to improve the quality of the virtual interpersonal communication and/or the replicated personality of the virtual avatar 108a of the target individual 108.

If it is determined that the evaluation received by the third party evaluator includes ratings under the predetermined threshold and/or improvement suggestion(s) (at block 506), the method 500 may proceed to block 508, wherein the method 500 may include determining if the user 104 accepts training the neural network 110 based on the ratings and/or the improvement suggestion(s). In one embodiment, upon determining that the third party evaluator inputs ratings under the predetermined threshold, the evaluation determinant module 158 may communicate with the ECU 114 and/or the head unit 116 to present a user interface prompt via the display unit 118 (or other mobile devices used by the user 104) to thereby present textual representations of one or more ratings that pertain to one or more points of time of the virtual interpersonal communication(s) between the user 104 and the virtual avatar 108a of the target individual 108. The user interface prompt may allow the user 104 accept further training of the neural network 110. The user interface prompt may allow the user 104 to input textual and/or vocal updates to the contextual data points and/or the associated behavioral attributes that may be associated with the target individual 108 and may be received through the display unit 118 and/or the voice recognition system 124 via the one or more microphones.

In some embodiments, upon determining that the third party evaluator provides textual or vocal feedback pertaining to one or more improvement suggestions, the evaluation determinant module 158 may communicate with the ECU 114 and/or the head unit 116 to present a user interface prompt via the display unit 118 (or other mobile devices used by the user 104) to thereby present textual representations of one or more feedback suggestions that may pertain to one or more points of time of the virtual interpersonal communication(s) between the user 104 and the virtual avatar 108a of the target individual 108. The user interface prompt may allow the user 104 accept further training of the neural network 110. The user interface prompt may also allow the user 104 to input textual and/or vocal updates to the contextual data points and/or the associated behavioral attributes that may be associated with the target individual 108 and may be received through the display unit 118 and/or the voice recognition system 124 via the one or more microphones.

If it is determined that the user 104 accepts training of the neural network 110 (at block 508), the method 500 may proceed to block 510, wherein the method 500 may include accessing the neural network 110 and updating contextual data points and/or associated behavioral attributes to be utilized for further virtual interpersonal communication. In an exemplary embodiment, if the user 104 accepts training the neural network 110 and provides updates to contextual data points and/or the associated behavioral attributes based on the feedback from the third-party evaluator, the evaluation determinant module 158 may access the neural network 110 with data pertaining to updates to the contextual data points and/or the associated behavioral attributes respectively associated to the user 104 and the target individual 108 to the neural network 110. The neural network 110 may analyze the data and may access the neural network machine learning database 150 to store the data pertaining to the updated contextual data points and/or associated behavioral attributes to thereby update the data set associated with the one-to-one interpersonal communication between the user 104 and the target individual 108.

The neural network 110 may thereby utilize deep learning techniques to be trained (or further trained) with respect to the particular content, one or more categories of context, one or more subcategories of context, one or more sub-topics, one or more event references, and/or one or more point of interest references that may be spoken by the user 104 and the target individual 108 and associated emotional characteristics and physiological characteristics that may be respectively exhibited by the user 104 and the target individual 108. Accordingly, the neural network 110 may be further trained with the personality, emotional characteristics, and physiological characteristics of the user 104 and the target individual 108 based on the feedback provided by the third party evaluator.

The method 500 may proceed to block 512, wherein the method 500 may include setting a remuneration for the third party evaluator and processing a payment to the third party evaluator. In one embodiment, the evaluation determinant module 158 may set a remuneration value based on one or more factors that may include, but may not be limited to, a length of the virtual interpersonal communication(s) session(s) viewed by the third party evaluator, a number of evaluations completed by the third party evaluator, an amount of feedback provided by the third party evaluator, and the like.

Upon analyzing the evaluation of a particular session(s) of virtual interpersonal communication, the evaluation determinant module 158 may set the remuneration value and may process a payment to the third party evaluator based on the set remuneration value. In some configurations, the evaluation determinant module 158 may access the storage unit 130 to retrieve the profile associated with the third party evaluator to determine bank account information. The evaluation determinant module 158 may be configured to utilize the communication unit 134 of the vehicle 102 and/or the communication unit 142 of the portable device 120 to process a payment(s) according to remuneration value directly to the bank account of the third party evaluator.

Figure 6:
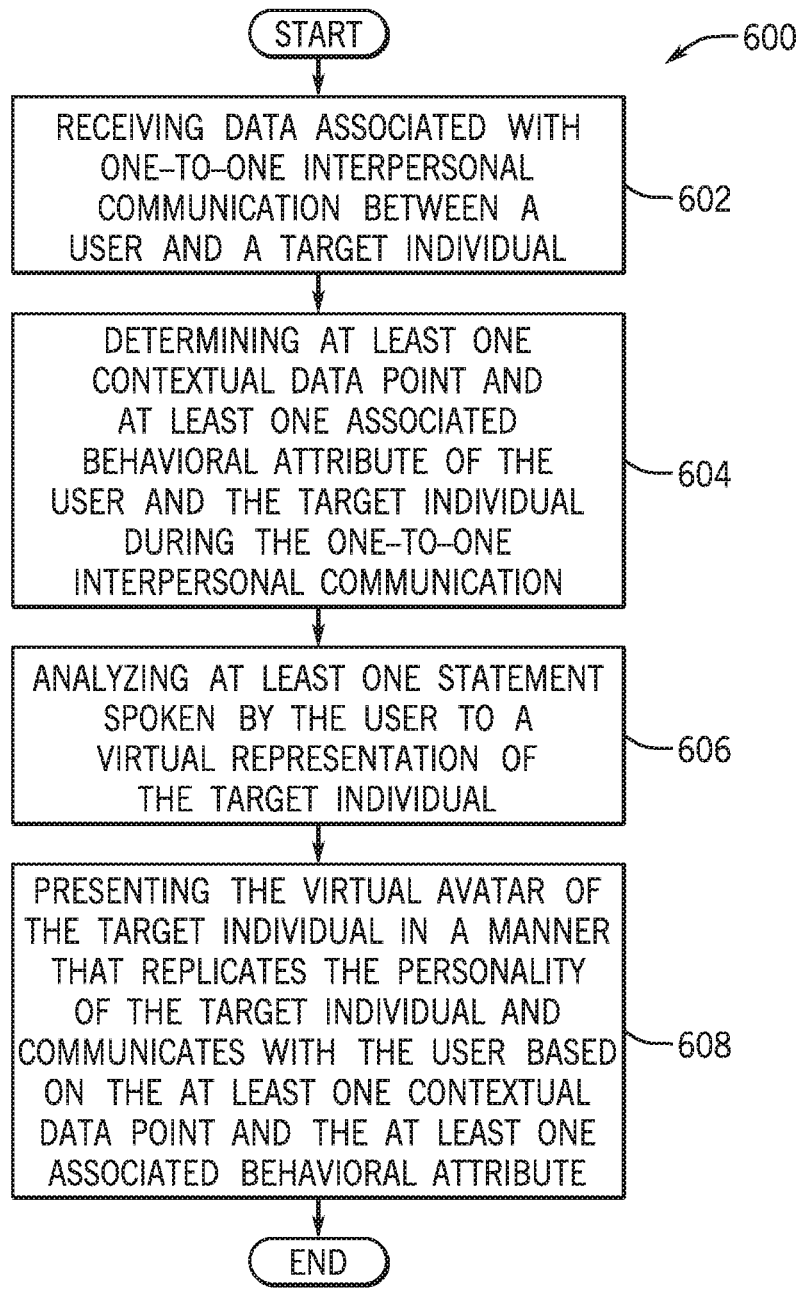
FIG. 6 is a process flow diagram of a method for providing virtual interpersonal communication that is executed by the virtual communication application according to an exemplary embodiment.

FIG. 6 is a process flow diagram of a method 600 for providing virtual interpersonal communication that is executed by the virtual communication application 106 according to an exemplary embodiment. FIG. 6 will be described with reference to the components of FIG. 1 though it is to be appreciated that the method 600 of FIG. 6 may be used with other systems and/or components. The method 600 may begin at block 602, wherein the method 600 may include receiving data associated with one-to-one interpersonal communication between a user 104 and a target individual 106.

The method 600 may proceed to block 604, wherein the method 600 may include determining at least one contextual data point and at least one associated behavioral attribute of the user 104 and the target individual 108 during the one-to-one interpersonal communication. The method 600 may proceed to block 606, wherein the method 600 may include analyzing at least one statement spoken by the user to a virtual representation of the target individual 108. In an exemplary embodiment, the virtual representation of the target individual 108 is presented as a virtual avatar 108a of the target individual 108.

The method 600 may proceed to block 608, wherein the method 600 may include presenting the virtual avatar 108a of the target individual 108 in a manner that replicates the personality of the target individual 108 and communicates with the user 104 based on the at least one contextual data point and the at least one associated behavioral attribute.

The embodiments discussed herein can also be described and implemented in the context of non-transitory computer-readable storage medium storing computer-executable instructions. Non-transitory computer-readable storage media includes computer storage media and communication media. For example, flash memory drives, digital versatile discs (DVDs), compact discs (CDs), floppy disks, and tape cassettes. Non-transitory computer-readable storage media can include volatile and nonvolatile, removable and non-removable media implemented in any method or technology for storage of information such as computer readable instructions, data structures, modules or other data. Non-transitory computer readable storage media excludes transitory and propagated data signals.

It will be appreciated that various embodiments of the above-disclosed and other features and functions, or alternatives or varieties thereof, may be desirably combined into many other different systems or applications. Also that various presently unforeseen or unanticipated alternatives, modifications, variations or improvements therein may be subsequently made by those skilled in the art which are also intended to be encompassed by the following claims.

The invention claimed is:

1. A computer-implemented method for providing virtual interpersonal communication, comprising:
    receiving data associated with one-to-one interpersonal communication between a user and a target individual;
    determining at least one contextual data point associated with statements spoken by the user and the target individual during the one-to-one interpersonal communication and at least one associated behavioral attribute of the user and the target individual based on emotional characteristics and physiological characteristics that are simultaneously exhibited and respectively associated with the user and the target individual during the one-to-one interpersonal communication;

analyzing at least one statement spoken by the user to a virtual representation of the target individual, wherein the virtual representation of the target individual is presented as a virtual avatar of the target individual; and presenting the virtual avatar of the target individual in a manner that replicates a personality of the target individual and communicates with the user based on the at least one contextual data point and the at least one associated behavioral attribute.

2. The computer-implemented method of claim 1, further including determining one-to-one interpersonal communication between the user and the target individual is occurring based on analysis of real-time vocal data associated with the statements spoken by the user and the target individual against voice recognition data files associated with the user and the target individual.

3. The computer-implemented method of claim 1, wherein the at least one contextual data point is associated with the statements spoken by the user and the target individual during the one-to-one interpersonal communication between the user and the target individual and pertains to at least one of: a context, at least one category of context, at least one sub-category of context, at least one event reference, and at least one point of interest reference included within the statements spoken by the user and the target individual during a course of the one-to-one interpersonal communication.

4. The computer-implemented method of claim 3, wherein determining at least one associated behavioral attribute includes analyzing image data that pertains to images of the user and the target individual, wherein machine learning image analysis is performed on the image data to determine the emotional characteristics associated with the user and the target individual during the course of the one-to-one interpersonal communication.

5. The computer-implemented method of claim 3, wherein determining at least one associated behavioral attribute includes analyzing sensor data pertaining to the one or more measurements of data sensed by a plurality of sensors, wherein machine learning sensor analysis is performed on the sensor data to determine the physiological characteristics associated with the user and the target individual during the course of the one-to-one interpersonal communication.

6. The computer-implemented method of claim 5, wherein analyzing at least one statement spoken by the user to the virtual representation of the target individual includes sensing a trigger phrase that is stated by the user, wherein the trigger phrase pertains to communication to the virtual avatar of the target individual.

7. The computer-implemented method of claim 5, wherein analyzing at least one statement spoken by the user to the virtual representation includes acquiring at least one contextual data point associated with the user and the target individual determined during one-to-one interpersonal communication that matches with at least one contextual data point determined based on the at least one statement spoken by the user to the virtual representation.

8. The computer-implemented method of claim 7, wherein presenting the virtual avatar of the target individual includes generating virtual response patterns according to the at least one contextual data point associated with the user and the target individual determined during one-to-one interpersonal communication that matches with the at least one contextual data point determined based on the at least one statement spoken by the user to the virtual representation.

9. The computer-implemented method of claim 8, wherein presenting the virtual avatar of the target individual includes generating at least one behavioral response according to the at least one behavioral attribute associated to the at least one contextual data point associated with the user and the target individual determined during one-to-one interpersonal communication.

10. A system for providing virtual interpersonal communication, comprising:

a memory storing instructions when executed by a processor cause the processor to:

receive data associated with one-to-one interpersonal communication between a user and a target individual;

determine at least one contextual data point associated with statements spoken by the user and the target individual during the one-to-one interpersonal communication and at least one associated behavioral attribute of the user and the target individual based on emotional characteristics and physiological characteristics that are simultaneously exhibited and respectively associated with the user and the target individual during the one-to-one interpersonal communication;

analyze at least one statement spoken by the user to a virtual representation of the target individual, wherein the virtual representation of the target individual is presented as a virtual avatar of the target individual; and present the virtual avatar of the target individual in a manner that replicates a personality of the target individual and communicates with the user based on the at least one contextual data point and the at least one associated behavioral attribute.

11. The system of claim 10, further including instructions to determine one-to-one interpersonal communication between the user and the target individual is occurring based on analysis of real-time vocal data associated with the statements spoken by the user and the target individual against voice recognition data files associated with the user and the target individual.

12. The system of claim 10, wherein the at least one contextual data point is associated with the statements spoken by the user and the target individual during the one-to-one interpersonal communication between the user and the target individual and pertains to at least one of: a context, at least one category of context, at least one sub-category of context, at least one event reference, and at least one point of interest reference included within the statements spoken by the user and the target individual during a course of the one-to-one interpersonal communication.

13. The system of claim 12, wherein determining at least one associated behavioral attribute includes analyzing image data that pertains to images of the user and the target individual, wherein machine learning image analysis is performed on the image data to determine the emotional characteristics associated with the user and the target individual during the course of the one-to-one interpersonal communication.

14. The system of claim 12, wherein determining at least one associated behavioral attribute includes analyzing sensor data pertaining to the one or more measurements of data sensed by a plurality of sensors, wherein machine learning sensor analysis is performed on the sensor data to determine the physiological characteristics associated with the user and the target individual during the course of the one-to-one interpersonal communication.

15. The system of claim 14, wherein analyzing at least one statement spoken by the user to the virtual representation of the target individual includes sensing a trigger phrase that is stated by the user, wherein the trigger phrase pertains to communication to the virtual avatar of the target individual.

16. The system of claim 14, wherein analyzing at least one statement spoken by the user to the virtual representation includes acquiring at least one contextual data point associated with the user and the target individual determined during one-to-one interpersonal communication that matches with at least one contextual data point determined based on the at least one statement spoken by the user to the virtual representation.

17. The system of claim 16, wherein presenting the virtual avatar of the target individual includes generating virtual response patterns according to the at least one contextual data point associated with the user and the target individual determined during one-to-one interpersonal communication that matches with the at least one contextual data point determined based on the at least one statement spoken by the user to the virtual representation.

18. The system of claim 17, wherein presenting the virtual avatar of the target individual includes generating at least one behavioral response according to the at least one behavioral attribute associated to the at least one contextual data point associated with the user and the target individual determined during one-to-one interpersonal communication.

19. A non-transitory computer readable storage medium storing instructions that when executed by a computer, which includes a processor perform a method, the method comprising:

receiving data associated with one-to-one interpersonal communication between a user and a target individual;

determining at least one contextual data point associated with statements spoken by the user and the target individual during the one-to-one interpersonal communication and at least one associated behavioral attribute of the user and the target individual based on emotional characteristics and physiological characteristics that are simultaneously exhibited and respectively associated with the user and the target individual during the one-to-one interpersonal communication;

analyzing at least one statement spoken by the user to a virtual representation of the target individual, wherein the virtual representation of the target individual is presented as a virtual avatar of the target individual; and presenting the virtual avatar of the target individual in a manner that replicates a personality of the target individual and communicates with the user based on the at least one contextual data point and the at least one associated behavioral attribute.

20. The non-transitory computer readable storage medium of claim 19, wherein presenting the virtual avatar of the target individual includes generating virtual response patterns according to the at least one contextual data point associated with the user and the target individual determined during one-to-one interpersonal communication that matches with the at least one contextual data point determined based on the at least one statement spoken by the user to the virtual representation.

* * * * *